(12) United States Patent
Tsuchiya et al.

(10) Patent No.: US 7,602,463 B2
(45) Date of Patent: Oct. 13, 2009

(54) LIQUID CRYSTAL DISPLAY DEVICE AND ELECTRONIC APPARATUS

(75) Inventors: Hitoshi Tsuchiya, Suwa (JP); Toshiharu Matsushima, Suwa (JP)

(73) Assignee: Sanyo Epson Imaging Devices Corp., Tokyo (JP)

( * ) Notice: Subject to any disclaimer, the term of this patent is extended or adjusted under 35 U.S.C. 154(b) by 575 days.

(21) Appl. No.: 11/485,382

(22) Filed: Jul. 13, 2006

(65) Prior Publication Data
US 2007/0013773 A1    Jan. 18, 2007

(30) Foreign Application Priority Data
Jul. 15, 2005    (JP)    ............................. 2005-207015
Jan. 25, 2006    (JP)    ............................. 2006-016017

(51) Int. Cl.
*G02F 1/1335*    (2006.01)
(52) U.S. Cl. ........................................................ 349/117
(58) Field of Classification Search ................. 349/114, 349/117
See application file for complete search history.

(56) References Cited

U.S. PATENT DOCUMENTS

| 7,088,409 | B2 | 8/2006 | Itou et al. | |
| 7,339,643 | B2 * | 3/2008 | Roosendaal et al. | 349/117 |
| 7,359,016 | B2 * | 4/2008 | Ha | 349/117 |
| 2005/0264731 | A1 | 12/2005 | Itou et al. | |
| 2006/0187388 | A1 * | 8/2006 | Ohyama et al. | 349/114 |
| 2006/0192912 | A1 | 8/2006 | Itou et al. | |

FOREIGN PATENT DOCUMENTS

| JP | 2003-344837 | 3/2003 |
| JP | A 2004-191646 | 7/2004 |
| JP | A-2005-338256 | 12/2005 |
| JP | A 2006-139286 | 6/2006 |
| WO | WO 2006/010431 A1 | 2/2006 |

OTHER PUBLICATIONS

M. O. Choi, et al., "A Single Gap Transflective Display using a Fringe-Field Driven Homogeneously Aligned Nematic Liquid Crystal Display," SID 05 Digest, pp. 719-721, May 2005.

(Continued)

*Primary Examiner*—David Nelms
*Assistant Examiner*—Phu Vu
(74) *Attorney, Agent, or Firm*—Oliff & Berridge, PLC

(57) ABSTRACT

A liquid crystal display device includes a first substrate and a second substrate opposed to each other with a liquid crystal layer therebetween, in which a first electrode and a second electrode are provided on a side of the first substrate opposed to the liquid crystal layer and the liquid crystal layer is driven by means of an electric field generated between the first electrode and the second electrode. A reflective display area for reflective display and a transmissive display area for transmissive display are formed in a sub pixel area. The thickness of the liquid crystal layer in the reflective display area is greater than the thickness of the liquid crystal layer in the transmissive display area. A retardation layer is selectively formed in an area corresponding to at least the reflective display area on a side of the second substrate opposed to the liquid crystal layer.

8 Claims, 12 Drawing Sheets

OTHER PUBLICATIONS

Y. H. Jeong, et al., "Voltage and Rubbing Angle Dependent Behavior of the Single Cell Gap Transflective Fringe Field Switching (FFS) Mode," SID 05 Digest, pp. 723-725, May 2005.

Gak Seok Lee, et al., "Optimization of Electrode Structure for Single Gamma in a Transflective IPS LCD," SID 05 Digest, pp. 738-741, May 2005.

Jung et al.; "P-97: A Novel Transflective Display Associated with Fringe-Field Switching." 2003 SID International Symposium Digest of Technical Papers. May 20-22, 2003. SID International Symposium Digest of Technical Papers. vol. 34; pp. 592-595.

Doornkamp et al.; "LP-11: *Late-News Poster*: Novel Transflective LCD with Ultra-wide Viewing Angle." 2004 SID International Symposium Digest Technical Papers. May 25-27, 2004. SID International Symposium Digest Technical Papers. vol. 35, prt 1; pp. 670-673.

Park et al.; "Configuration of a Transflective IPS LCD with an Optical Dummy Layer." $11^{th}$ International Display Workshops (IDW '04). Dec. 8, 2004. pp. 163-166.

* cited by examiner

LIQUID CRYSTAL DISPLAY DEVICE AND ELECTRONIC APPARATUS

This application claims the benefit of Japanese Patent Application No. 2005-207015 filed Jul. 15, 2005 and Japanese Patent Application No. 2006-16017 filed Jan. 25, 2006. The entire disclosure of the prior applications is hereby incorporated by reference herein their entirety.

BACKGROUND

1. Technical Field

The present invention relates to a liquid crystal display device and an electronic apparatus.

2. Related Art

A mode (hereinafter, referred to as a "transverse electric field mode") of controlling alignment of liquid crystal molecules by applying a substrate-in-plane electric field to a liquid crystal layer has been known as a mode of a liquid crystal display device. There have been also known an in-plane switching (IPS) mode and a fringe-field switching (FFS) mode depending upon the shapes of the electrodes for applying an electric field to the liquid crystal layer. Transflective liquid crystal display devices employing the transverse electric field mode have been studied.

The followings are examples of such liquid crystal display devices: JP-A-2003-344837; "A Single Gap Transflective Display using a Fringe-Field Driven Homogeneously Aligned Nematic Liquid Crystal Display," M. O. Choi et al., SID05 DIGEST, P. 719-721 (2005); "Voltage and Rubbing Angle Dependent Behavior of the Single Cell Gap Transflective Fringe Field Switching (FFS) Mode," Y. H. Jeong et al., SID05 DIGEST, P723-725; and "Optimization of Electrode Structure for Single Gamma in a Transflective IPS LCD", Gak Seok Lee et al., SID05 DIGEST, P738-741.

In the transverse-electric-field mode transflective liquid crystal display devices described in the above-mentioned known documents, circular polarized light necessary for reflective black display was obtained from the liquid crystal layer in JP-A-2003-344837 and from an inner retardation layer on the lower substrate side in the reference documents of M. O. Choi et al., Y. H. Jeong et al., and Gak Seok Lee et al. However, in the methods described in the above-mentioned known documents, since the reflective black display is colored due to a wavelength dispersion characteristic of a liquid crystal material and a material of the inner retardation layer, it is difficult to obtain high contrast.

In the reference documents of M. O. Choi et al., Y. H. Jeong et al., and Gak Seok Lee et al., since the inner retardation layer is also formed in the transmissive display area, a retardation film is required for the outer surface of the substrate in optical design, thereby causing a problem that a viewing angle at the time of transmissive display is narrowed.

SUMMARY

An advantage of the present invention is to provide a transverse-electric-field mode liquid crystal display device which can provide high-contrast display without being colored at the time of reflective display and can also provide high-contrast display and display with a wide viewing angle at the time of transmissive display.

According to an aspect of the invention, there is provided a liquid crystal display device comprising a first substrate and a second substrate opposed to each other with a liquid crystal layer therebetween, in which a first electrode and a second electrode are provided on a side of the first substrate opposed to the liquid crystal layer, the liquid crystal layer is driven by means of an electric field generated between the first electrode and the second electrode, and a reflective display area for reflective display and a transmissive display area for transmissive display are formed in a sub pixel area, wherein the thickness of the liquid crystal layer in the reflective display area is greater than the thickness of the liquid crystal layer in the transmissive display area, and wherein a retardation layer is selectively formed in an area corresponding to at least the reflective display area on a side of the second substrate opposed to the liquid crystal layer.

According to this configuration, incident light from the second substrate can be converted into wide-band circular polarized light by the use of the liquid crystal layer and the retardation layer formed on the side of the second substrate opposed to the liquid crystal layer. Accordingly, it is possible to provide reflective black display with small color, thereby embodying reflective display with high contrast.

Since the retardation layer is selectively formed in the area on the second substrate opposed to the liquid crystal layer and corresponding to the reflective display area, the same optical design as the transmissive mode is possible in the transmissive display, and it is possible to embody transmissive display with high contrast and a wide viewing angle.

The area of the second substrate opposed to the liquid crystal layer and corresponding to the reflective display area indicates an area of the second substrate opposed to the liquid crystal layer, where the area two-dimensionally overlaps with the reflective display area as seen two-dimensionally.

Since the thickness of the liquid crystal layer in the reflective display area is smaller than the thickness of the liquid crystal layer in the transmissive display area, it is possible to make electro-optical characteristics constant in the transmissive display and the reflective display.

As a result, it is possible to provide a liquid crystal display device with excellent display quality in which the transmissive display and the reflective display are consistent with each other.

In the liquid crystal display device according to an aspect of the invention, the liquid crystal layer in the reflective display area may give a phase difference of about $\lambda/4$ to incident light at the time of non-driving, and the retardation layer may give a phase difference of about $\lambda/2$ to the incident light.

According to this configuration, since the incident light from the second substrate can be converted into wider-band circular polarized light, it is possible to embody higher contrast at the time of the reflective display.

In the liquid crystal display device according to an aspect of the invention, the thickness of the liquid crystal layer may be adjusted by stacking the retardation layer and a resin layer. According to this configuration, it is possible to obtain an accurate thickness of the liquid crystal layer by means of the thickness of the resin layer regardless of the thickness of the retardation layer of which the phase difference should be priorly adjusted by means of its thickness, thereby providing a liquid crystal display device with high contrast.

In the liquid crystal display device according to an aspect of the invention, the first electrode and the second electrode may have a plurality of band-shaped electrodes. That is, an electric field (transverse electric field) generating configuration that the first electrode and the second electrode are two-dimensionally adjacent and opposed to each other in the same plane can be employed. For example, an electrode structure that the first electrode and the second electrode are both formed in a pectinated shape as seen two dimensionally and the band-shaped electrodes constituting the pectinated portions thereof are alternately arranged can be employed.

In the liquid crystal display device according to an aspect of the invention, the first electrode may be a two-dimensional solid electrode and the second electrode may have a plurality of band-shaped electrodes. That is, a configuration that the first electrode is formed in a two-dimensional solid shape, a dielectric layer is formed on the solid electrode, and the second electrode having a two-dimensional pectinated shape is formed on the dielectric layer can be employed.

In the transflective liquid crystal display device having the above-mentioned configuration, a reflective layer for carrying out the reflective display is partially formed in the sub pixel area, but the reflective layer is generally made of a metal film. Accordingly, when the first electrode, the second electrode, and the reflective layer are formed on the same substrate, the electric field generated between the first electrode and the second electrode may be deformed. On the contrary, when the first electrode is formed in a solid shape and the reflective layer is disposed in the vicinity of the solid electrode, the electric field is not affected. Accordingly, by employing the above-mentioned electrode shape, it is possible to simplify the structure of the liquid crystal display device, thereby easily manufacturing the liquid crystal display device.

In the liquid crystal display device according to an aspect of the invention, a color material layer having a plane area corresponding to the sub pixel area may be formed on the side of the second substrate opposed to the liquid crystal layer, the color material layer may have a first color material area corresponding to the transmissive display area and a second color material area corresponding to the reflective display area, and a recessed portion may be formed in the second color material area by removing a part of the color material layer. Here, a planarization layer for making at least the recessed portion of the color material layer flat may be formed on the color material layer and the retardation layer may be formed on the planarization layer.

According to this configuration, since the color material layer of which the chromaticity is adjusted for the transmissive display area and the reflective display area is provided, it is possible to make visual quality of the transmissive display and the reflective display constant. In addition, since the unevenness on the color material layer resulting from the adjustment of chromaticity is made flat by the planarization layer and then the retardation layer is formed thereon, it is difficult to cause deviation in thickness of the retardation or disturbance in alignment of the liquid-crystal polymers constituting the retardation layer. Accordingly, it is possible to provide a liquid crystal display device which can exhibit higher contrast.

According to another aspect of the invention, there is provided an electronic apparatus comprising the aforementioned liquid crystal display device. According to this configuration, it is possible to provide an electronic apparatus having a display unit with high contrast and wide viewing angle.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a liquid crystal display device according to a first embodiment of the present invention will be described with reference to the drawings. The liquid crystal display device according to the first embodiment employs a fringe field switching (FFS) mode among transverse electric field modes which display an image by applying an electric field (transverse electric field) to liquid crystal molecules in a in-plane direction of a substrate to control alignment of the liquid crystal molecules.

The liquid crystal display device according to the first embodiment a color liquid crystal display device having a color filter on the substrate, in which three sub pixels emitting colored light components of red (R), green (G), and blue (B) form a pixel. Accordingly, a display area serving as a unit constituting display is referred to as a "sub pixel area" and a display area including a set of sub pixels (R, G, and B) is referred to as a "pixel area."

Figure 1:
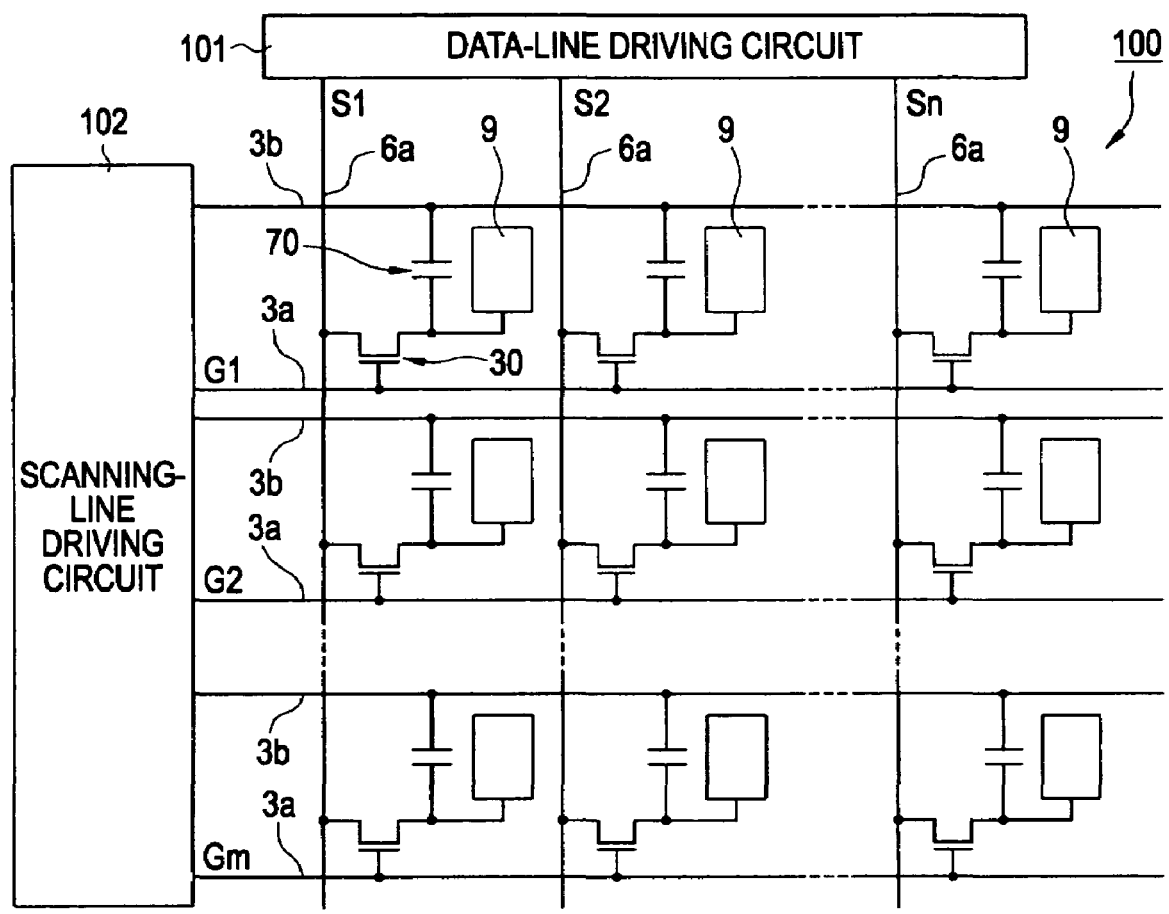
FIG. 1 is a circuit diagram illustrating a liquid crystal display device according to a first embodiment of the invention.
Figure 2A:
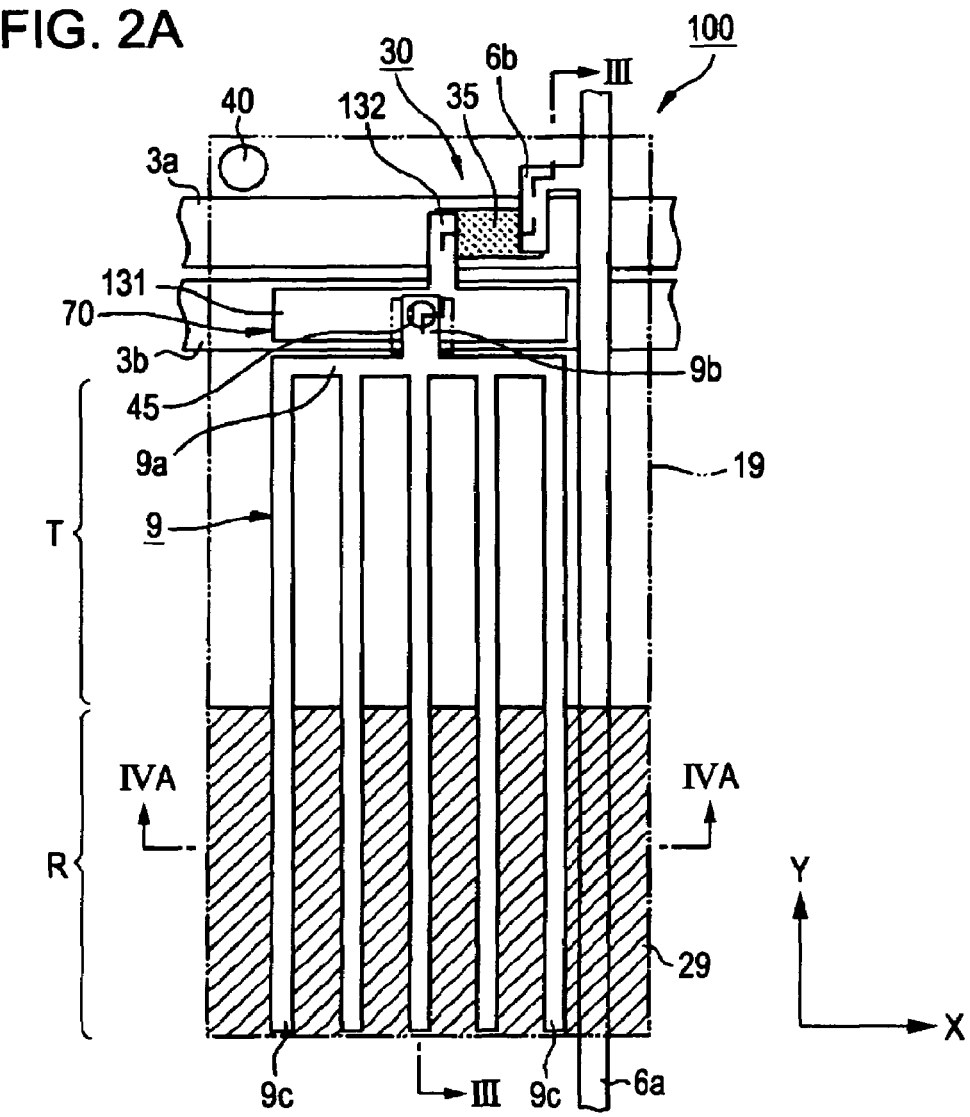
FIG. 2A is a plan view illustrating a sub pixel area in a liquid crystal display device according to the first embodiment and FIG. 2B is a diagram illustrating arrangement of optical axes in FIG. 2A.
Figure 2B:
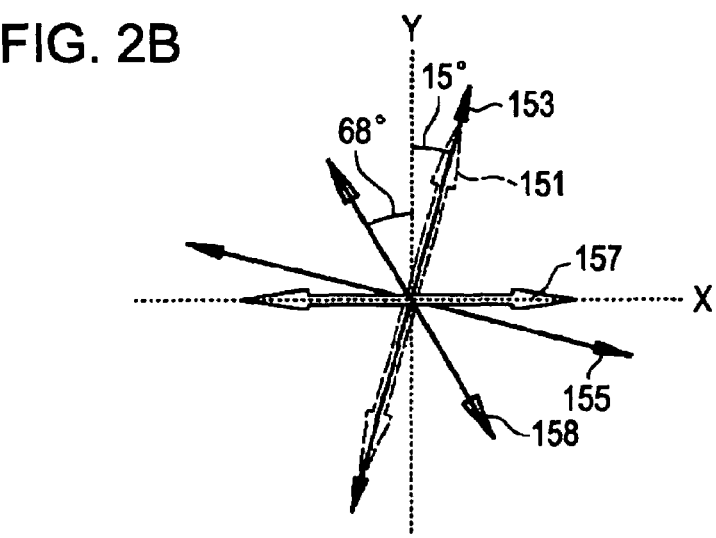
Figure 3:
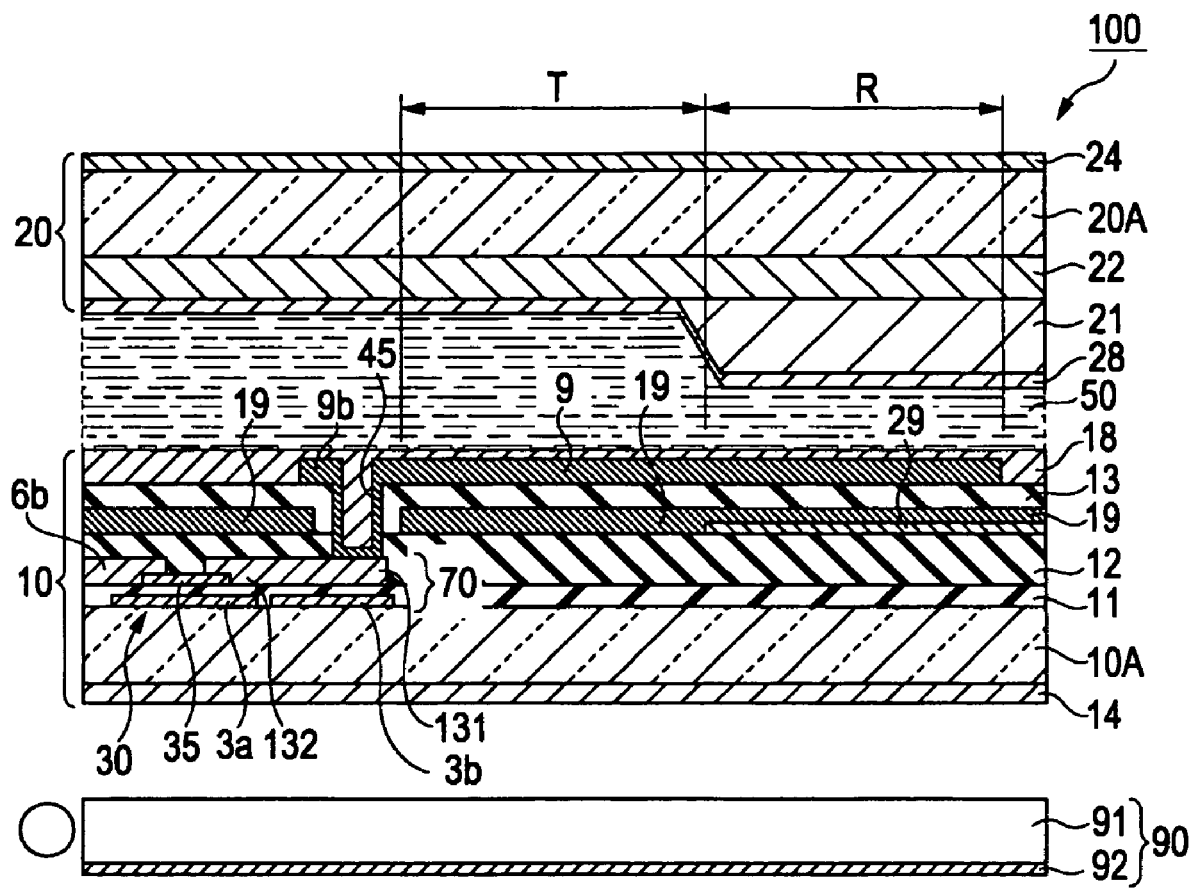
FIG. 3 is a partially sectional view taken along Line A-A' of FIG. 2A.

FIG. 1 is a circuit diagram illustrating a plurality of sub pixel areas arranged in a matrix shape in the liquid crystal display device according to the first embodiment. FIG. 2A is a plan view illustrating a sub pixel area in the liquid crystal display device 100 and FIG. 2B is a diagram illustrating arrangement of optical axes in FIG. 2A. FIG. 3 is a partially sectional view taken along Line A-A' of FIG. 2A.

Incidentally, layers or members are shown in different scales in the drawings so as to make it possible to recognize the layers or members from the drawings.

As shown in FIG. 3, the liquid crystal display device 100 according to the first embodiment is a transflective liquid crystal display device which includes a TFT array substrate (first substrate) 10 and a counter substrate (second substrate) 20 opposed to each other with a liquid crystal layer 50 therebetween and a backlight (lighting device) 90 disposed outside the TFT array substrate 10 (the opposite side of the liquid crystal layer 50) and in which a transmissive display area T and a reflective display area (corresponding to the formation area of a reflective layer 29) are partitioned in a sub pixel area as shown in FIGS. 2 and 3.

As shown in FIG. 1, in each of a plurality of sub pixel areas formed in a matrix shape to constitute an image display area of the liquid crystal display device 100, a pixel electrode 9 and a TFT 30 for switching the pixel electrode 9 are formed, and a data line 6a extending from a data-line driving circuit 101 is electrically connected to the source of the TFT 30. The data-line driving circuit 101 supplies image signals S1, S2, . . . , and Sn to the pixels through the data lines 6a. The image signals S1, S2, . . . , and Sn may be line-sequentially supplied in that order, or may be supplied to the data lines 6a adjacent to each other in a unit of group.

The gate of the TFT 30 is electrically connected to a scanning line 3a extending from a scanning-line driving circuit 102. Scanning signals G1, G2, . . . , and Gm pulse-like supplied to the scanning lines 3a from the scanning-line driving circuit 102 at a predetermined time are line-sequentially applied to the gates of the TFTs 30 in that order. The pixel electrode 9 is electrically connected to the drain of the TFT 30. By turning on the TFT 30 as a switching element in response to input of the scanning signals G1, G2, . . . , and Gm only for a predetermined time, the image signals S, S2, . . . , and Sn supplied from the data lines 6a are written to the pixel electrodes 9 at predetermined times.

The image signals S, S2, . . . , and Sn with a predetermined level written to the liquid crystal through the pixel electrodes 9 are retained between the pixel electrodes 9 and a common electrode opposed to the pixel electrodes with the liquid crystal therebetween for a predetermined time. Here, in order to prevent the retained image signals from leaking, a storage capacitor 70 is connected in parallel to a liquid crystal capacitor formed between the pixel electrode 9 and the common electrode. The storage capacitor 70 is formed between the drain of the TFT 30 and a capacitor line 3b.

As shown in FIG. 2A, the pixel electrode (first electrode) 9 which forms substantially a pectinated shape as seen two-dimensionally and is longitudinal in the Y axis direction (in the extension direction of the data lines, that is, the lines for supplying signals) and the common electrode (second electrode) 19 which is disposed to two-dimensionally overlap with the pixel electrode and has a substantially two-dimensional solid shape are formed in each sub pixel area of the liquid crystal display device 100. In the left-upper corner of the sub pixel area (or in the boundary with an adjacent sub pixel area) shown in the figure, a pillar-shaped spacer 40 for keeping the TFT array substrate 10 and the counter substrate 20 spaced with a predetermined gap is vertically provided.

The pixel electrode 9 has a plurality of (five in the figure) band-shaped electrodes (branched electrodes) 9c extending in the Y axis direction, a stem portion 9a which electrically connects (short-circuits) the band-shaped electrodes 9c to each other at the upper ends (+Y side) thereof in the figure and extends in the X axis direction (in the extension direction of the scanning lines 3a, that is, in the direction perpendicular to the lines), and a contact portion 9b extending in the +Y axis direction from the center in the X axis direction of the stem portion 9a.

The common electrode 19 is formed to cover the reflective layer 29 partially formed in the sub pixel area shown in FIG. 2A. In the first embodiment, the common electrode 19 is a conductive film made of a transparent conductive material such as ITO (Indium Tin Oxide), and the reflective layer 29 is formed out of a reflective metal film such as aluminum or silver, or a dielectric laminated film (dielectric mirror) formed by staking dielectric films ($SiO_2$ and $TiO_2$) having different refractive indexes.

In addition, the common electrode 19 may employ not only a structure that it is formed to cover the reflective layer 29 as in the first embodiment, but also a structure that a transparent electrode made of a transparent conductive material and a reflective electrode made of a reflective metal material are two-dimensionally partitioned, that is, a structure that a transparent electrode disposed to correspond to the transmissive display area and a reflective electrode disposed to correspond to the reflective display area are partitioned which are electrically connected to each other (in the boundary) between the reflective display area and the transmissive display area. In this case, the transparent electrode and the reflective electrode form a common electrode for generating an electric field along with the pixel electrode 9, and the reflective electrode also serves as the reflective layer of the sub pixel area.

In each sub pixel area, the data line 6a extending in the Y axis direction, the scanning line 3a extending in the X axis direction, and the capacitor line 3b being adjacent to the scanning line 3a and extending parallel to the scanning line 3a are formed. The TFT 30 is formed in the vicinity of an intersection between the data line 6a and the scanning line 3a. The TFT 30 includes a semiconductor layer 35 which is partially formed in a plane area of the scanning line 3a and is made of amorphous silicon, and a source electrode 6b and a drain electrode 132 of which parts are formed to two-dimensionally overlap with the semiconductor layer 35. The scanning line 3a serves as a gate electrode of the TFT 30 at a position which two-dimensionally overlaps with the semiconductor layer 35.

The source electrode 6b of the TFT 30 has a two-dimensional L shape which is branched from the data line 6a and extends to the semiconductor layer 35, and the drain electrode 132 extends in the −Y direction and is electrically connected to the capacitor electrode 131 has a substantially rectangular shape as seen two-dimensionally. On the capacitor electrode 131, the contact portion 9b of the pixel electrode 9 is formed to extend from the −Y side, and the capacitor electrode 131 and the pixel electrode 9 are electrically connected to each other through a pixel contact hole 45 formed at a position where both two-dimensionally overlap with each other. The capacitor electrode 131 is disposed in the plane area of the capacitor line 3b, thereby forming a storage capacitor 70 using the capacitor electrode 131 and the capacitor line 3b opposed to each other in the thickness direction at that position as electrodes thereof.

As seen from the sectional structure (sectional structure taken along Line A-A') of FIG. 2A shown in FIG. 3, the liquid crystal display device 100 has a structure that the liquid crystal layer 50 is interposed between the TFT array substrate (first substrate) 10 and the counter substrate (second substrate) 20 opposed to each other. The liquid crystal layer 50 is sealed between both substrates 10 and 20 by the use of a seal member (not shown) formed along the edges of the area in which the TFT array substrate 10 and the counter substrate 20 are opposed to each other. A backlight (lighting device) 90 having a light waveguide 91 and a reflective plate 92 is provided on the rear surface side (lower side in the figure) of the TFT array substrate 10.

The TFT array substrate 10 has a substrate body 10A made of glass, quartz, or plastic as a base body. The scanning line 3a and the capacitor line 3b are formed on the inner surface (the side opposed to the liquid crystal layer 50) of the substrate body 10A and a gate insulating layer 11 is formed to cover the scanning line 3*a* and the capacitor line 3*b*.

The semiconductor layer 35 made of amorphous silicon is formed on the gate insulating layer 11 and the source electrode 6*b* and the drain electrode 132 are formed, a part of which is placed on the semiconductor layer 35. The capacitor electrode 131 is formed integrally with the drain electrode 132 in the right side in the figure. The semiconductor layer 35 is opposed to the scanning line 3*a* with the gate insulating layer 11 therebetween and the scanning line 3*a* forms the gate electrode of the TFT 30 at the opposed area. The capacitor electrode 131 is opposed to the capacitor line 3*b* with the gate insulating layer 11 therebetween and the storage capacitor 70 using the gate insulating layer 11 as a dielectric layer is formed at the area where the capacitor electrode 131 and the capacitor line 3*b* are opposed to each other.

A first interlayer insulating layer 12 is formed to cover the semiconductor layer 35, the source electrode 6*b*, the drain electrode 132, and the capacitor electrode 131, and the reflective layer 29 is formed on a part of the first interlayer insulating layer 12. The common electrode 19 made of a transparent material such as ITO is formed to cover the reflective layer 29 and the first interlayer insulating layer 12.

Accordingly, in the liquid crystal display device 100 according to the first embodiment, among the sub pixel area shown in FIG. 2, an area other than the formation area of the reflective layer 29 in the plane area where the plane area including the pixel electrode 9 and the plane area including the common electrode 19 overlap with each other serves as the transmissive display area T which displays an image by modulating light irradiated from the backlight 90 and passing through the liquid crystal layer 50. An area where the plane area including the pixel electrode 9 and the plane area including the reflective layer 29 two-dimensionally overlap with each other serves as the reflective display area R which displays an image by reflecting and modulating light irradiated from the outside of the counter substrate 20 and passing through the liquid crystal layer 50.

A second interlayer insulating layer 13 made of silicon oxide or the like is formed to cover the common electrode 19 and the pixel electrode 9 made of a transparent conductive material such as ITO is formed on the second interlayer insulating layer 13.

Alignment layers 18 made of polyimide or silicon oxide are formed to cover the pixel electrode 9 and the second interlayer insulating layer 13.

A pixel contact hole 45 passing through the first interlayer insulating layer 12 and the second interlayer insulating layer 13 and reaching the capacitor electrode 131 is formed, and the pixel electrode 9 and the capacitor electrode 131 are electrically connected to each other by burying a part of the contact portion 9*b* of the pixel electrode 9 in the pixel contact hole 45. An opening is formed in the common electrode 19 to correspond to the formation area of the pixel contact hole 45, the pixel electrode 9 and the capacitor electrode 131 are electrically connected to each other in the opening, and the common electrode 19 and the pixel electrode 9 are not electrically connected to each other.

On the other hand, the counter substrate 20 has a substrate body 20A made of glass, quartz, or plastic as a base body and a color filter 22 is provided on the inner surface side (on the side opposed to the liquid crystal layer 50) of the substrate body 20A. A retardation layer 21 is selectively formed in the area on the color filter 22 corresponding to the reflective display area R, and an alignment layer 28 made of polyimide or silicon oxide is formed to cover the retardation layer 21 and the color filter 22.

In the first embodiment, the retardation layer 21 serves to give a phase difference of about ½ wavelength ($\lambda/2$) to the transmitted light and is a so-called inner retardation layer formed on the inner surface side of the substrate body 20A. The retardation layer 21 can be formed by the use of a method of coating the alignment layer with a solution of high-molecular liquid crystal or a solution of liquid-crystal monomer and aligning the liquid crystal molecules at the time of drying and solidifying the solution. The phase difference which the retardation layer 21 gives to the transmitted light can be controlled by the use of the kinds of the liquid-crystal polymer as the constituent materials or the thickness of the retardation layer 21.

The color filter 22 is formed out of a color material layer corresponding to a display color of each sub pixel, but the sub pixel area may be partitioned into two or more areas having different chromaticity. For example, a structure that a first color material area formed to correspond to the plane area of the transmissive display area T and a second color material area formed to correspond to the plane area of the reflective display area R are individually provided may be employed. In this case, by setting the chromaticity of the first color material area to be greater than the chromaticity of the second color material area, it is possible to prevent the chromaticity of display light from varying in the transmissive display area T where the display light passes through the color filter 22 only one time and the reflective display area R where the display light passes through the color filter 22 two times, thereby making visual quality constant in the transmissive display and the reflective display.

Polarizing plates 14 and 24 are disposed on the outer surfaces of the substrate bodies 10A and 20A. One or a plurality of retardation plates (optical compensation plates) can be provided between the polarizing plate 14 and the substrate body 10A and between the polarizing plate 24 and the substrate body 20A.

Arrangement of optical axes in the liquid crystal display device according to the first embodiment is shown in FIG. 2B. A transmission axis 153 of the polarizing plate 14 on the side of the TFT array substrate 10 and a transmission axis 155 of the polarizing plate 24 on the side of the counter substrate 20 are perpendicular to each other, and the transmission axis 153 forms about 15° in the clockwise direction with respect to the Y axis. The alignment layers 18 and 28 are rubbed in the same direction as seen two-dimensionally, and the direction thereof is the rubbing direction 151 shown in FIG. 2B, which is parallel to the transmission axis 153 of the polarizing plate 14 forming about 15° in the clockwise direction with respect to the Y axis direction. The rubbing direction 151 is not limited to the direction shown in FIG. 2B, but is preferably a direction intersecting (a direction not parallel to) the main direction 157 of an electric field generated between the pixel electrode 9 and the common electrode 19. In the first embodiment, the direction of the electric field 157 is parallel to the X axis direction. A phase-lag axis 158 of the retardation layer 21 forms 68° in the counterclockwise direction with respect to the transmission axis of the polarizing plate 14. In addition, although the initial alignment direction of the liquid crystal molecules in the liquid crystal layer 50 in the vicinity of the alignment layers 18 and 28 has been conveniently set as the rubbing direction, the alignment layers 18 and 28 are not limited to initially defining the alignment directions of the liquid crystal molecules by the use of a rubbing process, but may be an alignment layer which defines the initial alignment direction of the liquid crystal molecules, for example, by the use of an optical alignment method or an oblique evaporation method.

In the liquid crystal display device 100 having the above-mentioned structure, since the retardation layer 21 is selectively formed in the area on the color filter 22 corresponding to the reflective display area R, the thickness of the liquid crystal layer 50 is smaller by the thickness of the retardation layer 21 in the reflective display area R. That is, the retardation layer 21 serves as a liquid-crystal-layer-thickness adjusting layer for making the thickness of the liquid crystal layer in the reflective display area R different from the thickness of the liquid crystal layer in the transmissive display area T, in addition to the inner retardation layer.

Figure 4A:
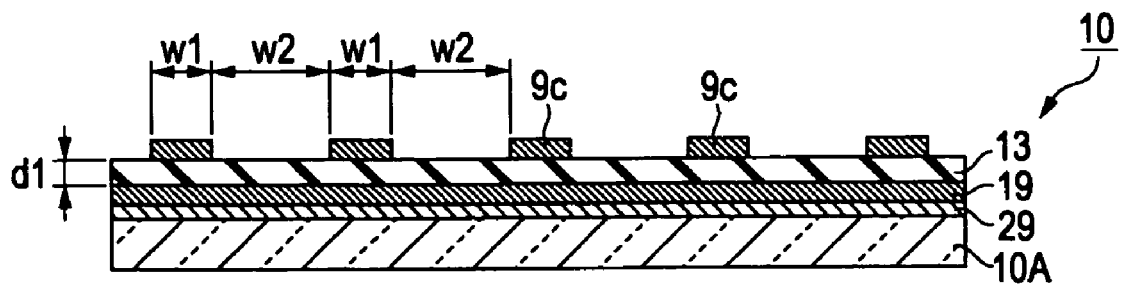
FIG. 4A is an explanatory diagram schematically illustrating a sectional structure (section taken along Line B-B') of a TFT array substrate according to the first embodiment and FIG. 4B is a graph illustrating a measurement result of an electro-optical characteristic of the liquid crystal display device according to the first embodiment.
Figure 4B:
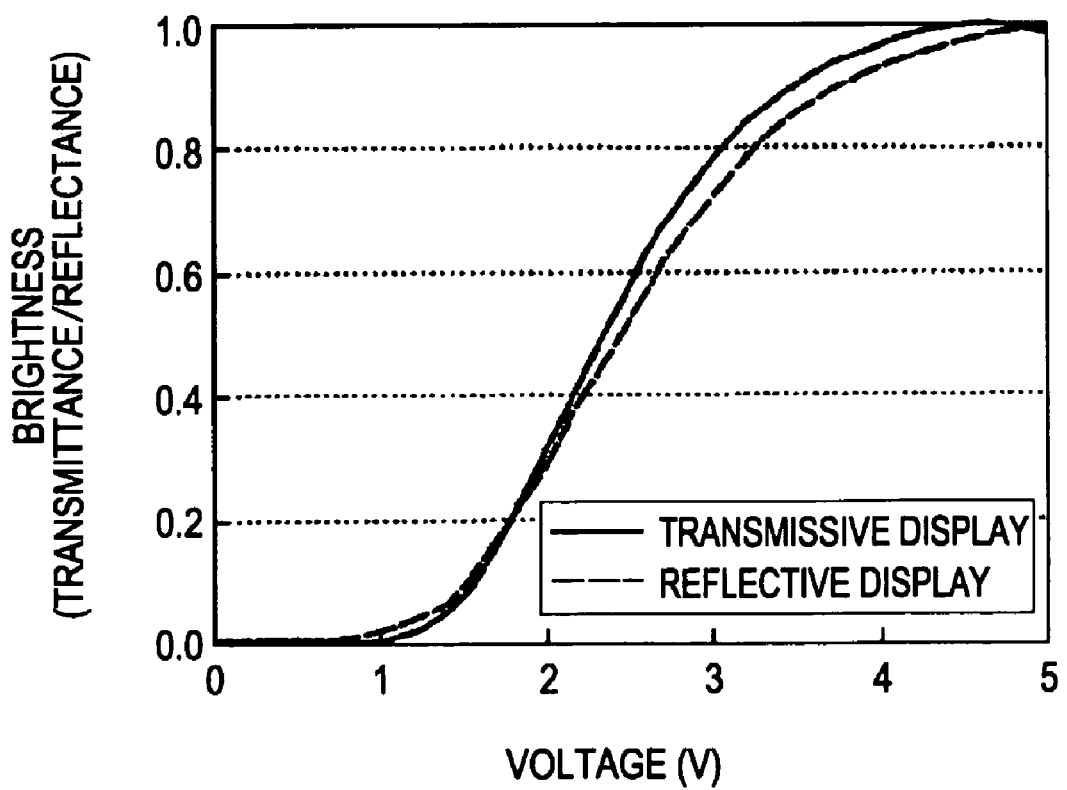

Here, FIG. 4A is an explanatory diagram illustrating a schematic sectional structure (sectional structure taken along Line B-B') of the TFT array substrate 10, and FIG. 4B is a graph illustrating a measurement result of an electro-optical characteristic of the liquid crystal display device 100. FIG. 4B shows transmittance and reflectance in which the maximum transmittance and the maximum reflectance are normalized into 1. The measurement result shown in FIG. 4B is obtained by assuming that in the structure of the TFT array substrate 10 shown in FIG. 4A, the width w1 of the band-shaped electrodes (branched electrodes) 9c extending in a branch shape parallel to each other from the stem portion 9a is 3 µm, the gap w2 between the band-shaped electrodes 9c and 9c adjacent to each other is 5 µm, the thickness d1 of the second interlayer insulating layer 13 is 0.5 µm, and the relative dielectric constant $\epsilon$ is 7.

The thickness of the liquid crystal layer (cell gap) in the transmissive display area T is 3.5 µm and the thickness of the liquid crystal layer in the reflective display area R is 1.4 µm (that is, the thickness of the retardation layer 21 is 2.1 µm). In addition, the relative dielectric constants of the liquid crystal are $\epsilon_{//}=10$ and $\epsilon_{\perp}=4$, and $\Delta n$ is 0.1.

As shown in FIG. 4B, in the liquid crystal display device according to the first embodiment, the tendency that the transmittance and the reflectance are enhanced almost similarly in both of the transmissive display and the reflective display with increase in applied voltage is obtained in the range of voltage (0 V to 5 V) generally used for driving liquid crystal, and the variation in transmittance and the variation in reflectance with variation in voltage are almost equal to each other. Accordingly, by using the liquid crystal display device according to the first embodiment, it is possible to embody a display device in which reflective display quality and transmissive display quality are consistent with each other in any of white display, black display, and intermediate gray-scale display.

In the liquid crystal display device carrying out reflective display, when the reflective black display is carried out in optical design, external light reaching the reflective layer 29 is necessarily circular polarized light at all the visible wavelengths. At this time, when the external light reaching the reflective layer 29 is elliptical polarized light, the black display is colored, thereby making it difficult to obtain high-contrast reflective display.

Therefore, in the liquid crystal display device according to the first embodiment, the retardation layer 21 is formed in only the area on the color filter 22 corresponding to the reflective display area R and the thickness of the liquid crystal layer in the reflective display area R is set to 1.4 µm ($\Delta n \cdot d$=140 nm). Accordingly, it is possible to generate wideband circular polarized light by the use of the polarization plate 24, the retardation layer 21, and the liquid crystal layer 50 in the reflective display area R and thus to make the external light reaching the reflective layer 29 substantially circular polarized light at all the visible wavelengths, thereby obtaining high-contrast reflective display.

In the liquid crystal display device according to the first embodiment, since the retardation layer 21 is formed in only the area on the color filter 22 corresponding to the reflective display area R, the same optical design as a transmissive liquid crystal display device employing a conventional transverse electric field mode can be possible in the transmissive display area T. As a result, it is possible to embody transmissive display with a wide viewing angle.

In the liquid crystal display device according to the first embodiment described above, since the retardation layer 21 is selectively formed in only the area on the color filter 22 corresponding to the reflective display area R. Accordingly, even when an area ratio between the transmissive display area T and the reflective display area R varies, it is possible to easily cope with the variation in area ratio only by changing the formation area of the reflective layer 29 and the formation area of the retardation layer 21, without changing the structure of the electrodes.

Although the reflective layer 29 has been disposed on the side of the TFT array substrate 10 in the first embodiment, the reflective layer 29 may be disposed on the side of the counter substrate 20 and the retardation layer 21 may be disposed on the side of the TFT array substrate. In this case, the same characteristic can be obtained.

Second Embodiment

Figure 5A:
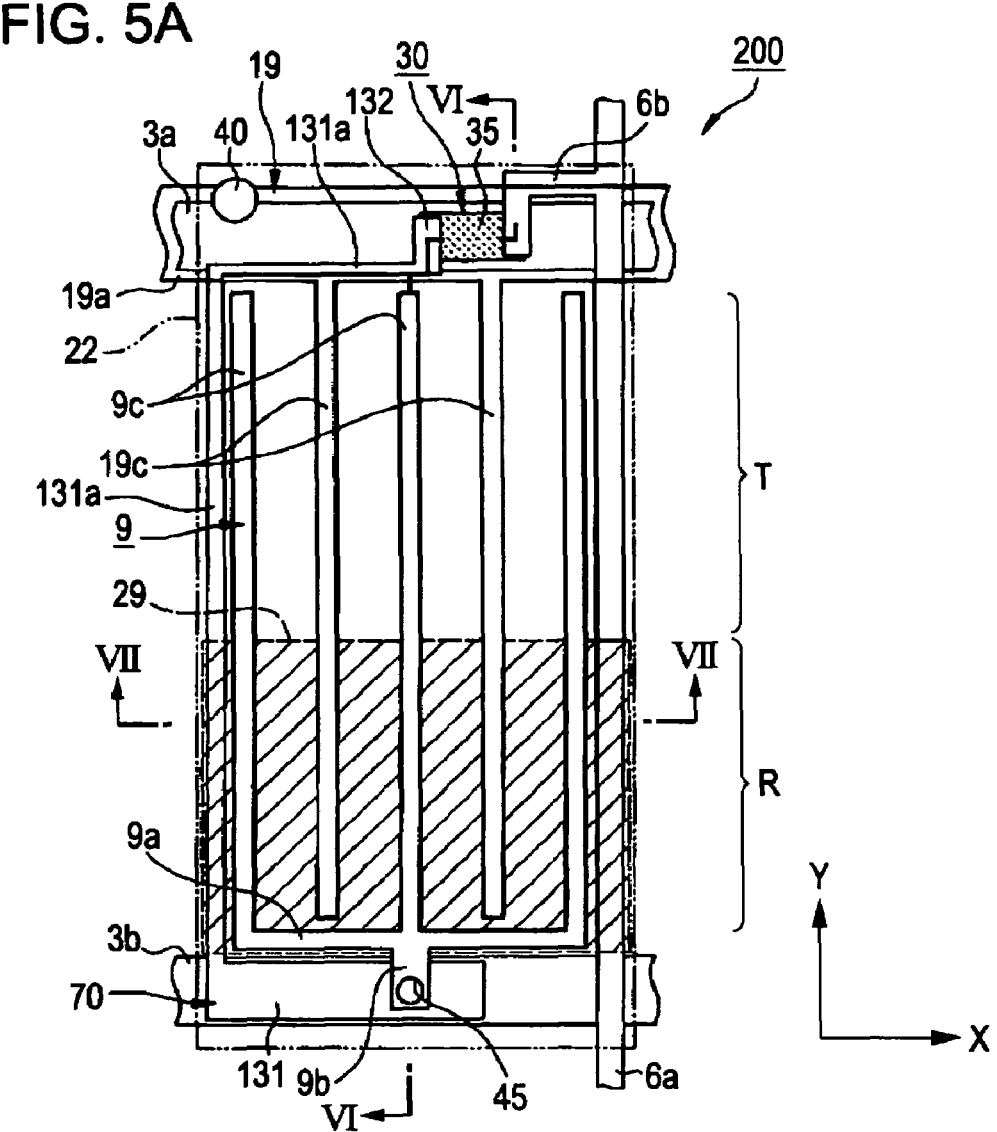
FIG. 5A is a plan view illustrating a sub pixel area in a liquid crystal display device according to a second embodiment and FIG. 5B is a diagram illustrating arrangement of optical axes in FIG. 5A.
Figure 5B:
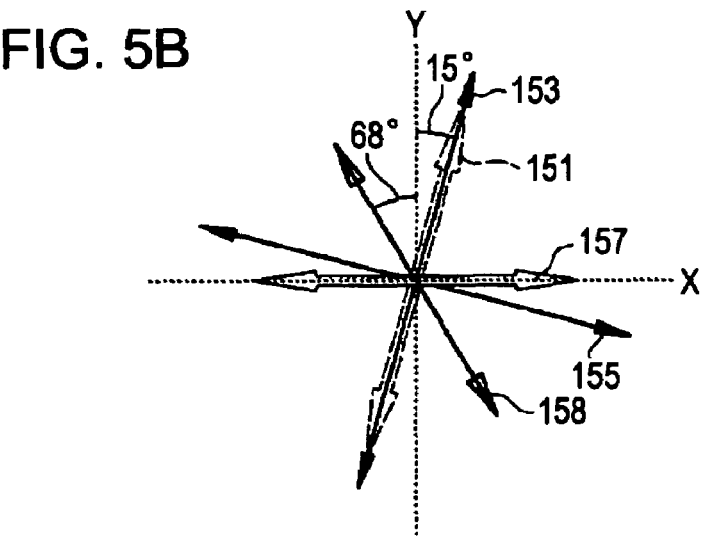
Figure 6:
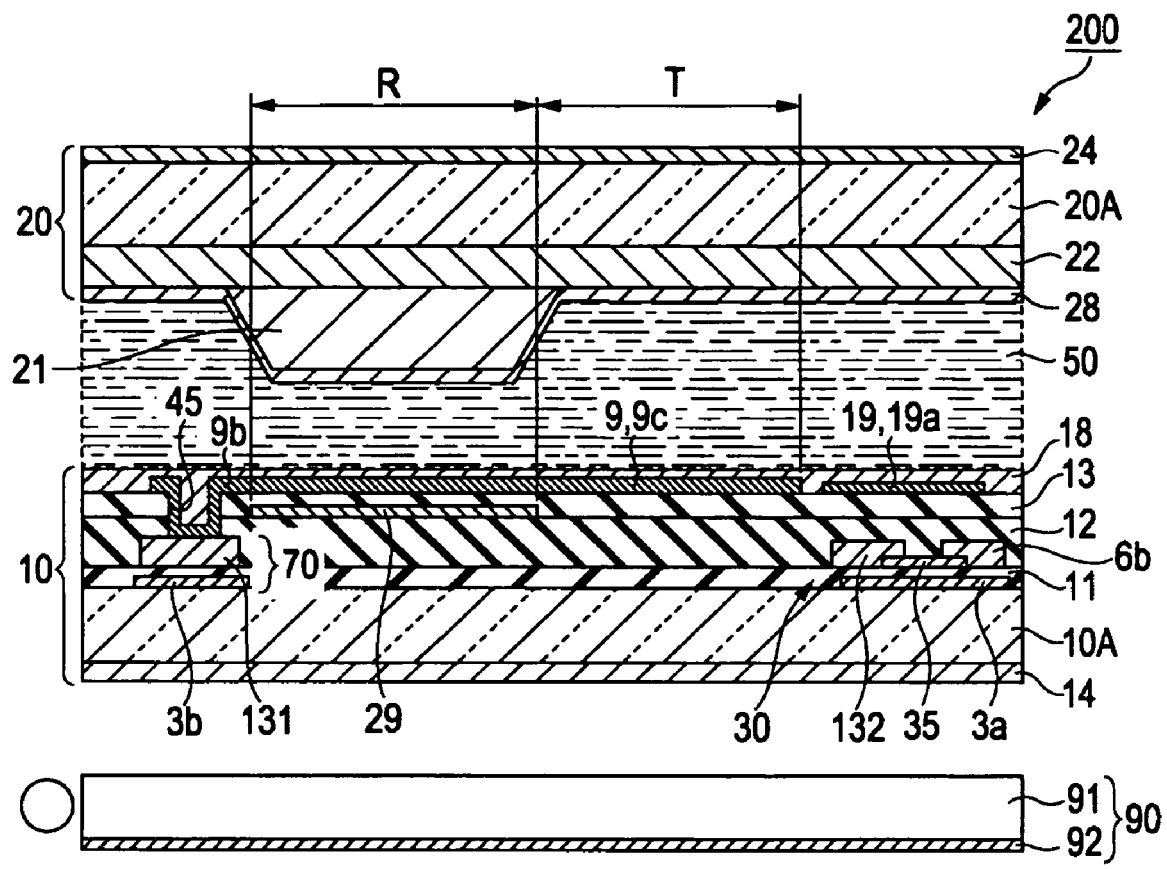
FIG. 6 is a partially sectional view taken along Line D-D' of FIG. 5A.

Next, a second embodiment of the invention will be described with reference to the drawings. FIG. 5A is a plan view illustrating a sub pixel area of a liquid crystal display device 200 and FIG. 5B is a diagram illustrating arrangement of optical axes in FIG. 5A. FIG. 6 is a partially sectional view taken along Line D-D' of FIG. 5A.

The liquid crystal display device 200 according to the second embodiment has a basic structure substantially similar to that of the liquid crystal display device 100 according to the first embodiment, but is different from the liquid crystal display device 100 in that the pixel electrode 9 and the common electrode 19 are both formed in a pectinated shape as seen two-dimensionally, and band-shaped electrodes (branched electrodes) constituting the pectinated portions and extending in a rod shape are formed in the same layer. In addition, in FIGS. 5, 6, and 7, the same reference numerals denote the same elements as the liquid crystal display device 100 shown in FIGS. 1 to 4.

As shown in FIG. 5A, a pixel electrode (first electrode) 9 which forms a pectinated shape as seen two-dimensionally and which is longitudinal in the Y axis direction and a common electrode (second electrode) 19 which forms a pectinated shape as seen two-dimensionally and which is longitudinal in the Y axis direction are formed in a sub pixel area of the liquid crystal display device 200. In the left-upper corner of the sub pixel area, a pillar-shaped spacer 40 for keeping the TFT array substrate 10 and the counter substrate 20 spaced with a predetermined gap is provided.

The pixel electrode 9 has a plurality of (three in the figure) band-shaped electrodes (branched electrodes) 9c extending in the Y axis direction, a stem portion 9a which electrically connects (short-circuits) the band-shaped electrodes 9c to each other at the lower ends (—Y side) thereof in the figure and extends in the X axis direction, and a contact portion 9b extending in the –Y axis direction from the center in the X axis direction of the stem portion 9a.

The common electrode 19 has a plurality of (two in the figure) band-shaped electrodes 19c which are arranged to alternate with the band-shaped electrodes 9c of the pixel electrode 9 and extend parallel to the band-shaped electrodes 9c (in the Y axis direction) and a main line portion 19a which electrically connects the band-shaped electrodes 19c to each other at an end in the +Y direction (an end opposed to the end of the band-shaped electrodes) thereof and extends in the X axis direction. The common electrode 19 is an electrode member having a pectinated shape as seen two-dimensionally and extending over a plurality of sub pixel areas arranged in the X axis direction.

In the sub pixel area shown in FIG. 5A, by applying a voltage between three band-shaped electrodes 9c of the pixel electrode 9 extending in the Y axis direction and two band-shaped electrodes 19c of the common electrode 19 disposed between the band-shaped electrodes 9c, an electric field (transverse electric field) in the XY-plane direction (substrate plane direction) is applied to the liquid crystal molecules in the sub pixel area, thereby driving the liquid crystal molecules.

In the sub pixel area shown in FIG. 5A, the data line 6a extending in the Y axis direction, the scanning line 3a extending in the X axis direction, and the capacitor line 3b extending parallel to the scanning line 3a along the side edge of the sub pixel area opposite to the scanning line 3a are formed. The TFT 30 is formed in the vicinity of an intersection between the data line 6a and the scanning line 3a. The TFT 30 includes a semiconductor layer 35 which is partially formed in a plane area of the scanning line 3a and is made of amorphous silicon, and a source electrode 6b and a drain electrode 132 of which parts are formed to two-dimensionally overlap with the semiconductor layer 35. The scanning line 3a serves as a gate electrode of the TFT 30 at a position which two-dimensionally overlaps with the semiconductor layer 35.

The source electrode 6b of the TFT 30 has a two-dimensional L shape which is branched from the data line 6a and extends to the semiconductor layer 35, and the drain electrode 132 is electrically connected to a connection line 131a at the –Y end thereof. The connection line 131a extends to a side edge in the –X direction of the sub pixel area and extends again in the Y axis direction along the side edge, and an end thereof is electrically connected to the capacitor electrode 131 formed on the side edge of the sub pixel area opposed to the scanning line 3a. The capacitor electrode 131 is a conductive member having a rectangular shape as seen two-dimensionally and two-dimensionally overlapping with the capacitor line 3b, the contact portion 9b of the pixel electrode 9 is formed on the capacitor electrode 131 to two-dimensionally overlap with each other, and a pixel contact hole 45 for electrically connecting the capacitor electrode 131 and the pixel electrode 9 to each other is formed at a position where both two-dimensionally overlap with each other. A storage capacitor 70 using the capacitor electrode 131 and the capacitor line 3b opposed to each other in the thickness direction as electrodes thereof is formed at the area where the capacitor electrode 131 and the capacitor line 3b two-dimensionally overlap with each other.

In the sectional structure (sectional structure taken along Line D-D') shown in FIG. 6, the liquid crystal layer 50 is interposed between the TFT array substrate 10 and the counter substrate 20 opposed to each other. The TFT array substrate 10 has a transparent substrate body 10A made of glass, quartz, or plastic as a base body. The scanning line 3a and the capacitor line 3b are formed on the inner surface (the side opposed to the liquid crystal layer 50) of the substrate body 10A and a gate insulating layer 11 made of a transparent insulating material such as silicon oxide is formed to cover the scanning line 3a and the capacitor line 3b.

The semiconductor layer 35 made of amorphous silicon is formed on the gate insulating layer 11, and the source electrode 6b and the drain electrode 132 are formed, a part of which is placed on the semiconductor layer 35. The drain electrode 132 is formed integrally with the connection line 131a and the capacitor electrode 131. The semiconductor layer 35 is opposed to the scanning line 3a through the gate insulating layer 11 and the scanning line 3a forms the gate electrode of the TFT 30 at the opposed area. The capacitor electrode 131 is opposed to the capacitor line 3b through the gate insulating layer 11, thereby forming the storage capacitor 70 using the capacitor electrode 131 and the capacitor line 3b as electrodes and using the gate insulating layer 11 as a dielectric layer interposed therebetween.

A first interlayer insulating layer 12 made of silicon oxide is formed to cover the semiconductor layer 35, the source electrode 6b, the drain electrode 132, and the capacitor electrode 131, and the reflective layer 29 is formed on a part of the first interlayer insulating layer 12.

Accordingly, in the liquid crystal display device 200 according to the second embodiment, among the sub pixel area shown in FIG. 5, an area where the plane area including the pixel electrode 9 and the common electrode 19 and the formation area of the reflective layer 29 overlap with each other serves as the reflective display area R which displays an image by reflecting and modulating light irradiated from the outside of the counter substrate 20 and passing through the liquid crystal layer 50. An area where the reflective layer 29 is not formed in the plane area including the pixel electrode 9 and including the common electrode 19 serves as the transmissive display area T.

A second interlayer insulating layer 13 made of silicon oxide is formed to cover the first interlayer insulating layer 12 and the reflective layer 29, and the pixel electrode 9 and the common electrode 19 made of a transparent conductive material such as ITO are formed on the second interlayer insulating layer 13.

An alignment layer 18 made of polyimide or silicon oxide is formed to cover the pixel electrode 9, the common electrode, and the second interlayer insulating layer 13.

A pixel contact hole 45 passing through the first interlayer insulating layer 12 and the second interlayer insulating layer and reaching the capacitor electrode 131 is formed, and the pixel electrode 9 and the capacitor electrode 131 are electrically connected to each other by burying a part of the contact portion 9b of the pixel electrode 9 in the pixel contact hole 45.

On the other hand, the counter substrate 20 has a substrate body 20A made of glass, quartz, or plastic as a base body, and a color filter 22 is provided on the inner surface side (on the side opposed to the liquid crystal layer 50) of the substrate body 20A. A retardation layer 21 is formed in the area on the color filter 22 corresponding to the reflective display area R, and an alignment layer 28 made of polyimide or silicon oxide is formed to cover the retardation layer 21 and the color filter 22.

In the second embodiment, the retardation layer 21 serves to give a phase difference of about ½ wavelength ($\lambda/2$) to the transmitted light and is a so-called inner retardation layer. The retardation layer 21 can be formed by the use of a method of coating the alignment layer with a solution of high-molecular liquid crystal or a solution of liquid-crystal monomer and aligning the liquid crystal molecules at the time of drying and solidifying the solution. The phase difference which the retardation layer 21 gives to the transmitted light can be controlled by the use of the kinds of the liquid-crystal polymer as the constituent materials or the thickness of the retardation layer 21.

The color filter 22 is formed out of a color material layer corresponding to a display color of each sub pixel, but the sub pixel area may be partitioned into two or more areas having different chromaticity. For example, a structure that a first color material area formed to correspond to the plane area of the transmissive display area T and a second color material area formed to correspond to the plane area of the reflective display area R are individually provided may be employed. In this case, by setting the chromaticity of the first color material area to be greater than the chromaticity of the second color material area, it is possible to prevent the chromaticity of display light from varying in the transmissive display area T where the display light passes through the color filter 22 only one time and the reflective display area R where the display light passes through the color filter 22 two times, thereby making visual quality constant in the transmissive display and the reflective display.

Polarizing plates 14 and 24 are disposed on the outer surfaces of the substrate bodies 10A and 20A. One or a plurality of retardation plates (optical compensation plates) can be provided between the polarizing plate 14 and the substrate body 10A and between the polarizing plate 24 and the substrate body 20A.

Arrangement of optical axes in the liquid crystal display device according to the second embodiment is shown in FIG. 5B. A transmission axis 153 of the polarizing plate 14 on the side of the TFT array substrate 10 and a transmission axis 155 of the polarizing plate 24 on the side of the counter substrate 20 are perpendicular to each other, and the transmission axis 153 forms about 15° in the clockwise direction with respect to the Y axis. The alignment layers 18 and 28 are rubbed in the same direction as seen two-dimensionally, and the direction thereof is the rubbing direction 151 shown in FIG. 5B, which is parallel to the transmission axis 153 of the polarizing plate 14 forming about 15° in the clockwise direction with respect to the Y axis direction. The rubbing direction 151 is not limited to the direction shown in FIG. 5b, but is preferably a direction intersecting (a direction not parallel to) the main direction 157 of a transverse electric field generated between the pixel electrode 9 and the common electrode 19. In the second embodiment, the direction 157 of the transverse electric field is parallel to the X axis direction. A phase-lag axis 158 of the retardation layer 21 forms 68° in the counterclockwise direction with respect to the transmission axis of the polarizing plate 14. In addition, although the rubbing direction has been mentioned conveniently in the description, the rubbing direction indicates the initial alignment direction of the liquid crystal molecules at the positions contacting the alignment layers and is not limited to the initial alignment direction of the liquid crystal molecules defined by a rubbing process, but may include an initial alignment direction defined, for example, by the use of an optical alignment method or an oblique evaporation method.

In the liquid crystal display device 200 having the above-mentioned structure, since the retardation layer 21 is selectively formed in the area on the color filter 22 corresponding to the reflective display area R, the thickness of the liquid crystal layer 50 is smaller by the thickness of the retardation layer 21 in the reflective display area R.

Figure 7A:
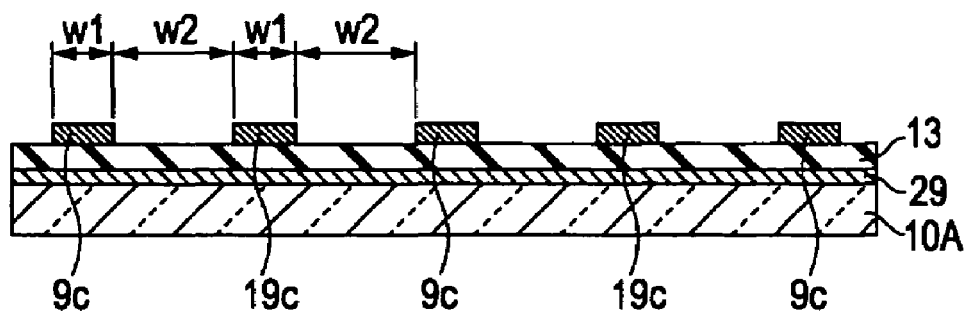
FIG. 7A is an explanatory diagram schematically illustrating a sectional structure (section taken along Line F-F') of a TFT array substrate according to the second embodiment and FIG. 7B is a graph illustrating a measurement result of an electro-optical characteristic of the liquid crystal display device according to the second embodiment.
Figure 7B:
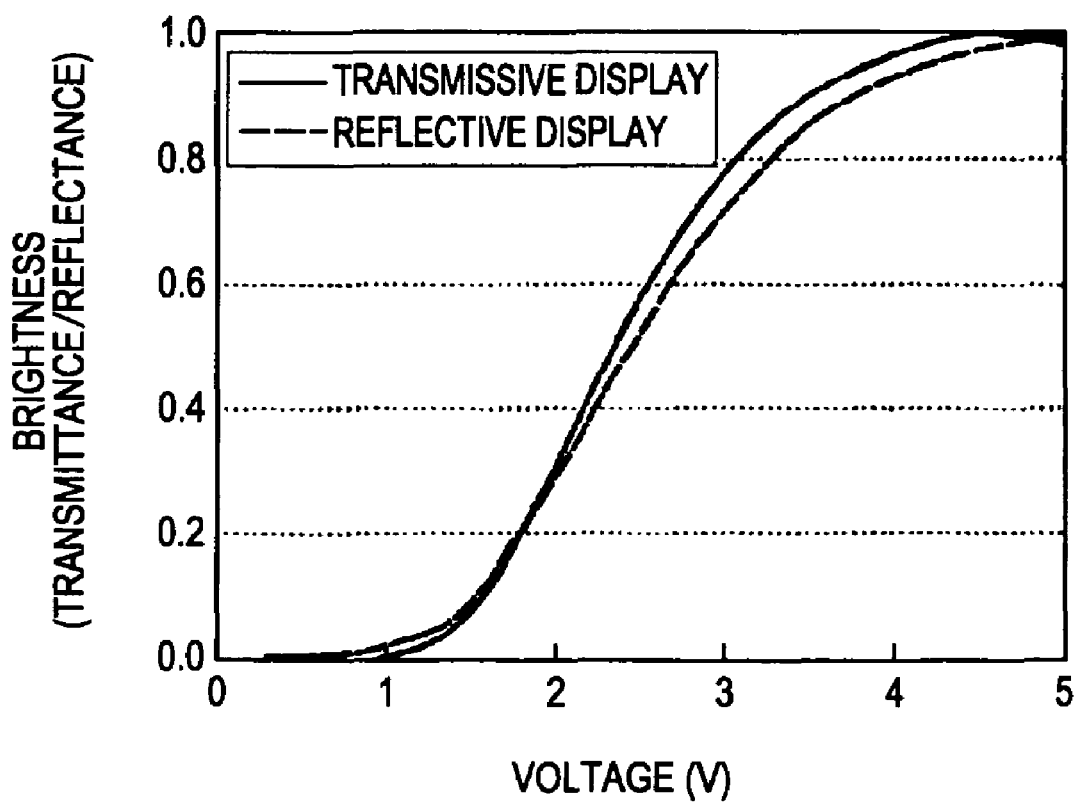

Here, FIG. 7A is an explanatory diagram illustrating a schematic sectional structure (sectional structure taken along Line F-F') of the TFT array substrate 10, and FIG. 7B is a graph illustrating a measurement result of an electro-optical characteristic of the liquid crystal display device 200. FIG. 7B shows transmittance and reflectance in which the maximum transmittance and the maximum reflectance are normalized into 1. The measurement result shown in FIG. 7B is obtained by assuming that in the structure of the TFT array substrate 10 shown in FIG. 7A, the width w1 of the band-shaped electrodes (branched electrodes) 9c and 19c is 3 μm and the gap w2 between the band-shaped electrodes 9c and 19c adjacent to each other is 5 μm.

Here, the thickness of the liquid crystal layer (cell gap) in the transmissive display area T is 3.5 μm and the thickness of the liquid crystal layer in the reflective display area R is 1.4 μm (that is, the thickness of the retardation layer 21 is 2.1 μm). In addition, the relative dielectric constants of the liquid crystal are $\epsilon_{//}=10$ and $\epsilon_{\perp}=4$, and $\Delta n$ is 0.1.

As shown in FIG. 7B, in the liquid crystal display device according to the second embodiment, the tendency that the transmittance and the reflectance are enhanced almost similarly in both of the transmissive display and the reflective display with increase in applied voltage is obtained in the range of voltage (0 V to 5 V) generally used for driving liquid crystal, and the variation in transmittance and the variation in reflectance with variation in voltage are almost equal to each other. Accordingly, by using the liquid crystal display device according to the second embodiment, it is possible to embody a display device in which reflective display quality and transmissive display quality are consistent with each other in any of white display, black display, and intermediate gray-scale display.

In the liquid crystal display device carrying out the reflective display, when the reflective black display is carried out in optical design, external light reaching the reflective layer 29 is necessarily circular polarized light at all the visible wavelengths. At this time, when the external light reaching the reflective layer 29 is elliptical polarized light, the black display is colored, thereby making it difficult to obtain high-contrast reflective display.

Therefore, in the liquid crystal display device according to the second embodiment, the retardation layer 21 is formed in only the area on the color filter 22 corresponding to the reflective display area R and the thickness of the liquid crystal layer in the reflective display area R is set to 1.4 μm ($\Delta n \cdot d=140$ nm). Accordingly, it is possible to generate wide-band circular polarized light by the use of the polarization plate 24, the retardation layer 21, and the liquid crystal layer 50 in the reflective display area R and thus to make the external light reaching the reflective layer 29 substantially circular polarized light at all the visible wavelengths, thereby obtaining high-contrast reflective display.

In the liquid crystal display device according to the second embodiment, since the retardation layer 21 is selectively formed in the area on the color filter 22 corresponding to the reflective display area R, the same optical design as a transmissive liquid crystal display device employing a conventional transverse electric field mode can be possible in the transmissive display area T. As a result, it is possible to embody transmissive display with a wide viewing angle.

In the liquid crystal display device according to the second embodiment described above, since the retardation layer 21 is selectively formed in only the area on the color filter 22 corresponding to the reflective display area R. Accordingly, even when an area ratio between the transmissive display area T and the reflective display area R varies, it is possible to easily cope with the variation in area ratio only by changing the formation area of the reflective layer 29 and the formation area of the retardation layer 21, without changing the structure of the electrodes.

Although the reflective layer 29 has been disposed on the side of the TFT array substrate 10 in the second embodiment, the reflective layer 29 may be disposed on the side of the counter substrate 20 and the retardation layer 21 may be disposed on the side of the TFT array substrate. In this case, the same characteristic can be obtained.

Third Embodiment

Figure 8:
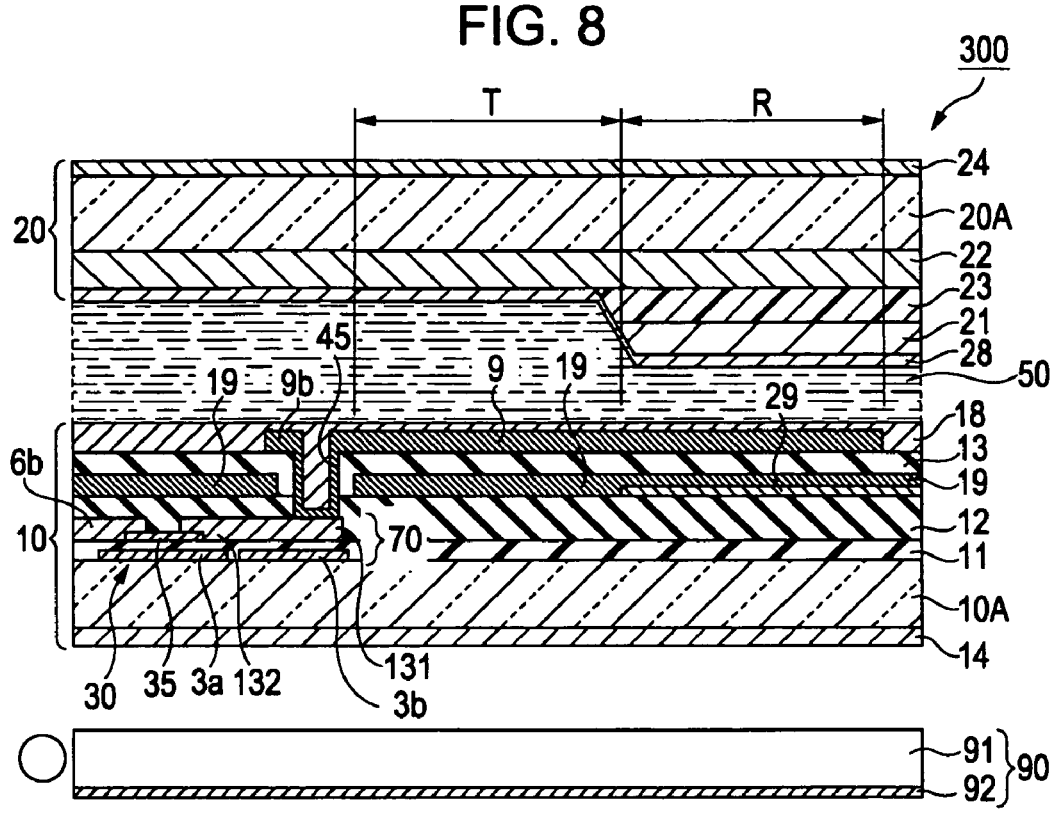
FIG. 8 is a partially sectional view illustrating a liquid crystal display device according to a third embodiment.

Next, a third embodiment of the invention will be described with reference to FIG. 8. A liquid crystal display device 300 according to the third embodiment has the same basic structure as the liquid crystal display device according to the first embodiment, but is different from the liquid crystal display device according to the first embodiment, in that a resin layer 23 and a retardation layer 21 are stacked in an area on the color filter 22 corresponding to the reflective display area R. Accordingly, the two-dimensional structure of a sub pixel area and the arrangement of optical axes are completely equal to those of the first embodiment and thus description thereof is omitted. In FIG. 8, the same elements as the liquid crystal display device 100 shown in FIGS. 1 to 4 are denoted by the same reference numerals and detailed description thereof is omitted.

FIG. 8 is a partially sectional view illustrating the liquid crystal display device according to the third embodiment. The sectional structure shown in the figure corresponds to the sectional structure shown in FIG. 3 according to the first embodiment, and also corresponds to the sectional structure taken along Line A-A' shown in FIG. 2. In the third embodiment, the liquid crystal layer 50 includes liquid crystal molecules with $\epsilon_{//}=10$, $\epsilon_{\perp}=4$, and $\Delta n=0.1$. Accordingly, in order to generate wide-band circular polarized light by the use of the polarizing plate 24, the retardation layer 21, and the liquid crystal layer 50 in the reflective display area R, it is necessary to set the thickness of the liquid crystal layer in the reflective display area R to 2.0 μm ($\Delta n \cdot d = 140$ nm). On the other hand, in the transmissive display area T, it is necessary to set the thickness of the liquid crystal layer in the transmissive display area T to 5 μm so as to secure sufficient brightness. Accordingly, the thickness of the liquid crystal layer in the reflective display area R should be smaller by 3.0 μm than the thickness of the liquid crystal layer in the transmissive display area T, but when the thickness of the retardation layer 21 is 3.0 μm, the phase difference of the retardation layer 21 greatly departs from the wavelength of λ/2 of the transmitted light, thereby not generating the wide-band circular polarized light. As a result, the reflective black display is colored, thereby lowering the contrast.

Therefore, as in the third embodiment, by stacking the resin layer 23 and the retardation layer 21 in the area on the color filter 22 corresponding to the reflective display area R, the retardation layer 21 can give a phase difference of about λ/2 to the transmitted light and thus the thickness of the liquid crystal layer in the reflective display area R can be made to be smaller by 3.0 μm than the thickness of the liquid crystal layer in the transmissive display area T. As a result, the same characteristic as the first embodiment and the second embodiment can be obtained.

Accordingly, in the liquid crystal display device 300 according to the third embodiment, it is possible to enhance the degree of freedom in design.

Although such a structure that the resin layer 23 and the retardation layer 21 formed selectively are stacked in the area on the color filter 22 corresponding to the reflective display area R has been used in the third embodiment, the stack order may be changed so as to stack the retardation layer 21 and the resin layer 23 in the area on the color filter 22 corresponding to the reflective display area R in this order.

Although the reflective layer 29 has been disposed on the side of the TFT array substrate 10 in the third embodiment, the same characteristic can be obtained even when the reflective layer 29 is disposed on the side of the counter substrate 20 and the retardation layer 21 is disposed on the side of the TFT array substrate.

Fourth Embodiment

Next, a fourth embodiment of the invention will be described with reference to FIGS. 10 and 11.

A liquid crystal display device 400 according to the fourth embodiment is a FFS mode liquid crystal display device having the same basic structure as the liquid crystal display device according to the first embodiment, but is different from the liquid crystal display device according to the first embodiment, in that the structure of the color filter 22 on the counter substrate 20 is different and a planarization layer 25 is formed on the color filter 22. Accordingly, the arrangement of optical axes of the liquid crystal display device is completely equal to that of the first embodiment and thus description thereof is omitted. In FIGS. 10 and 11, the same elements as the liquid crystal display device 100 shown in FIGS. 1 to 4 are denoted by the same reference numerals and detailed description thereof is omitted.

Figure 10:
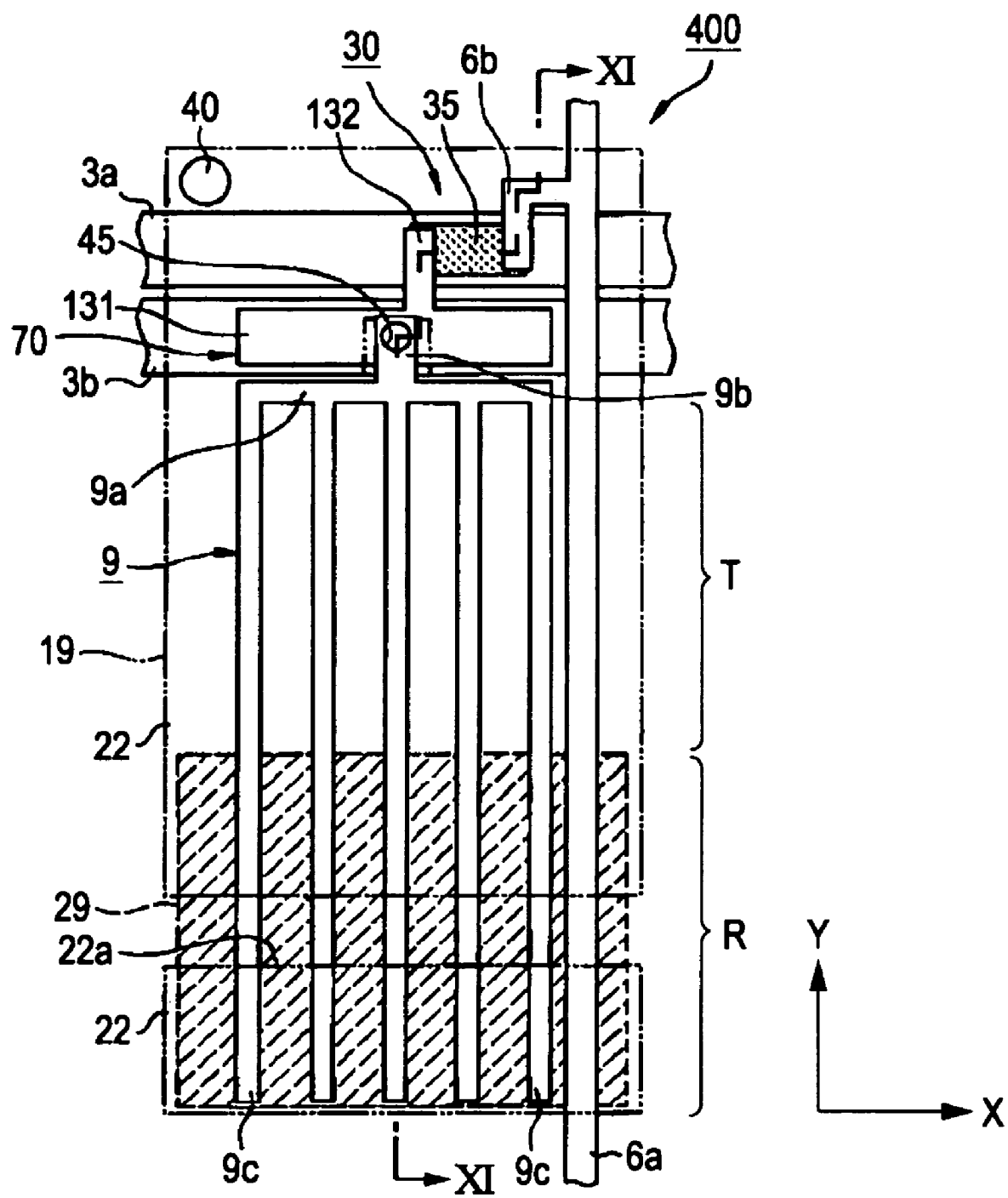
FIG. 10 is a plan view illustrating a liquid crystal display device according to a fourth embodiment.

As shown in FIG. 10, the color filters (color material layer) 22 are formed to correspond to the sub pixel areas of the liquid crystal display device 400, and a band-shaped opening 22a crossing the corresponding sub pixel area in the X axis direction is formed in each color filter 22. The opening 22a is formed at the center in the Y axis direction of the reflective display area R. The width in the Y axis direction of the opening 22a is about ⅕ of the width in the Y axis direction of the reflective display area R. Accordingly, the color filter 22 according to the fourth embodiment has a first color material area formed out of a color material layer having no opening corresponding to the transmissive display area T and a second color material area formed out of a color material layer having the opening corresponding to the reflective display area R. The chromaticity of the whole second color material area having the opening 22a is less than that of the first color material area corresponding to the transmissive display area T. Accordingly, it is possible to allow the visual quality of the reflective display using the light passing through the color filter 22 two times for the display to be equal to that of the transmissive display.

Figure 11:
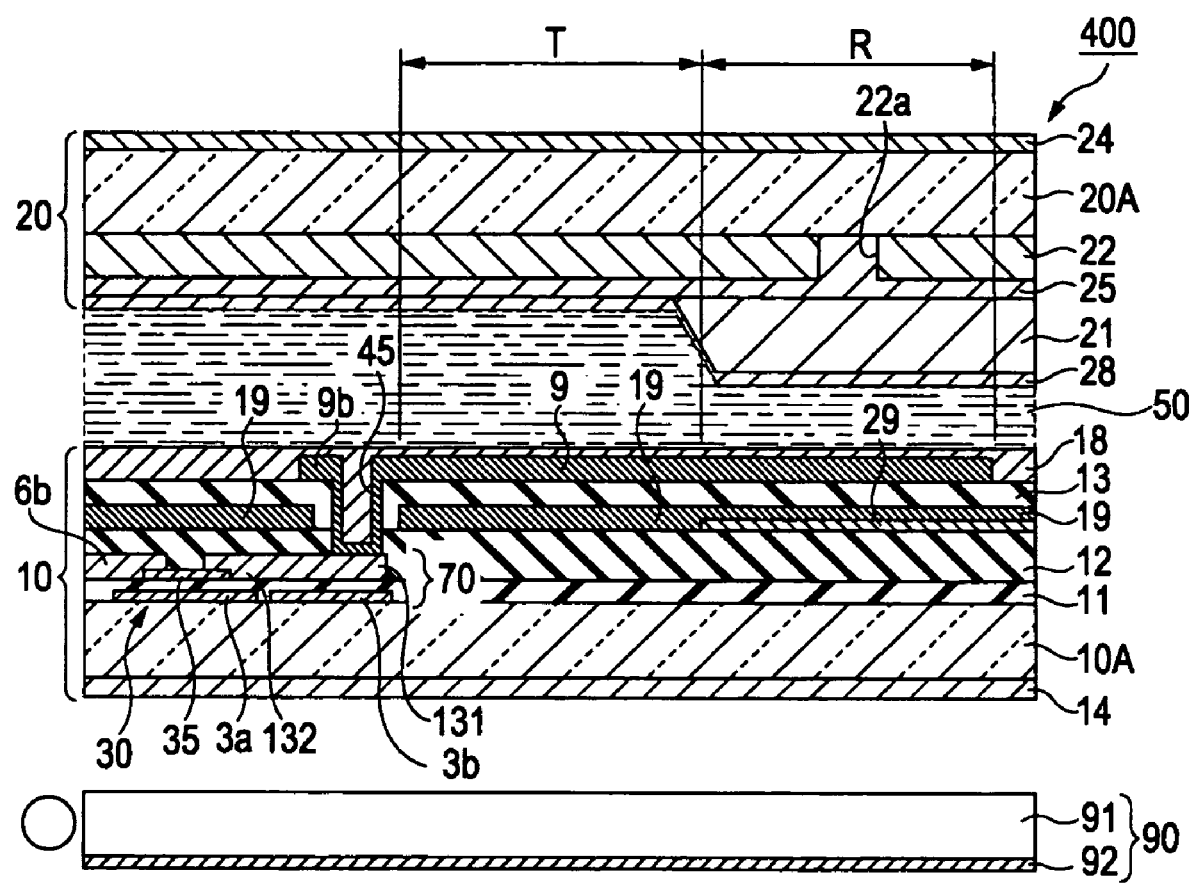
FIG. 11 is a partially sectional view taken along Line G-G' of FIG. 10.

As can be seen from the sectional structure shown in FIG. 11, the color filter 22 is formed on the inner surface of the substrate body 20A as a base body of the counter substrate (second substrate) 20 and the planarization layer 25 is formed to cover the color filter 22. In addition, the planarization layer 25 is filled in a recessed portion on the substrate body 20A resulting from the opening 22a of the color filter 22 to fill the recessed portion. As a result, the surface of the planarization layer 25 opposed to the liquid crystal layer 50 forms a flat plane and the retardation layer 21 is formed on the flat plane. The planarization layer 25 can be made of, for example, acryl or silicon oxide.

In the liquid crystal display device 400 according to the fourth embodiment having the above-mentioned structure, in order to adjust the chromaticity of the color filter 22 in the reflective display area R, the opening 22a is provided, the unevenness resulting from the opening 22a is made flat by the planarization layer 25, and then the retardation layer 21 is formed thereon. The phase difference varies in accordance with the thickness of the retardation layer 21. Accordingly, when the retardation layer 21 is formed without forming the planarization layer 25, the thickness of the retardation layer 21 is increased at the position corresponding to the opening 22a, the phase difference of the transmitted light is uneven, and the alignment of liquid-crystal polymers constituting the retardation layer 21 can be easily disturbed, thereby causing decrease in contrast.

On the contrary, in the fourth embodiment, since the unevenness resulting from the opening 22a is made flat by the planarization layer 25 and then the retardation layer 21 is formed, it is possible to easily form the retardation layer 21 having a desired phase difference, thereby obtaining high-contrast display.

As the color filter 22, different color material layers are formed in different sub pixel areas, and the thicknesses of the color material layers can be different from each other. Accordingly, when the retardation layer 21 is formed directly on the color filter 22, the height of the retardation layer 21 protruded into the liquid crystal layer 50 may be different between the sub pixels having different color filters 22. Therefore, by making the unevenness on the surface of the color filter 22 in the sub pixel area flat by the use of the planarization layer 25 according to the fourth embodiment and thus making the unevenness between the sub pixels flat, it is possible to unify the protruded height of the retardation layer 21 serving as a liquid-crystal-layer-thickness adjusting layer, thereby easily obtaining high-contrast display.

As a result of measuring the electro-optical characteristic of the liquid crystal display device 400 according to the fourth embodiment similarly to the liquid crystal display device 100 according to the first embodiment, it is possible to obtain the same result as the liquid crystal display device 100 shown in FIG. 4B and thus to embody a display device in which reflective display quality and transmissive display quality are consistent with each other in any of white display, black display, and intermediate gray-scale display.

Although it has been described in the fourth embodiment that a band-shaped opening crossing the sub pixel area in the X axis direction is provided as the opening 22a of the color filter 22, the two-dimensional shape of the opening 22a is not limited to the band shape, but may employ a variety of shapes. For example, an opening having a rectangular shape, a polygonal shape, or a circular shape may be formed in the color material layer in the reflective display area R.

Although it has been described in the fourth embodiment that the opening 22a is selectively formed to adjust the chromaticity of the second color material area corresponding to the reflective display area R, the following structures may be used to adjust the chromaticity: a structure that the thickness of the color material layer in the second color material area is set smaller than the thickness of the color material layer in the first color material area; a structure that a color material layer having chromaticity different from that of the first color material area is formed in the second color material area; and a structure that color material areas having three or more colors are formed in the sub pixel area to obtain desired chromaticity by a mixed color thereof. Even when any of the structures described above is employed, unevenness resulting from the difference in thickness of the color material layers may be formed on the surface of the color filter 22 and thus it may be difficult to obtain the desired phase difference only by forming the retardation layer 21 directly on the color filter 22. Even when the surface of the color filter 22 is made flat in the reflective display area R, the height of the retardation layer 21 protruded into the liquid crystal layer 50 may not be even between the sub pixels having different color material layers formed therein, because the retardation layer 21 according to the invention also serves as a liquid-crystal-layer-thickness adjusting layer for making the thickness of the liquid crystal layer 50 different between the transmissive display area T and the reflective display area R. Therefore, as in the fourth embodiment, by forming the planarization layer 25 to cover the color filter 22 and then forming the retardation layer 21 on the corresponding planarization layer 25, it is possible to make not only the thickness of the retardation layer 21 but also the height of the retardation layer 21 protruded into the liquid crystal layer 50 uniform between the sub pixels, thereby obtaining the high-contrast display from the whole display area.

Fifth Embodiment

Next, a fifth embodiment of the invention will be described with reference to FIGS. 12 and 13.

A liquid crystal display device 500 according to the fifth embodiment is an IPS mode liquid crystal display device having the same basic structure as the liquid crystal display device 200 according to the second embodiment, but is different from the liquid crystal display device according to the second embodiment, in that the structure of the color filter 22 on the counter substrate 20 is different and a planarization layer 25 is formed on the color filter 22. Accordingly, the arrangement of optical axes of the liquid crystal display device is completely equal to that of the second embodiment and thus description thereof is omitted. In FIGS. 12 and 13, the same elements as the liquid crystal display device 200 shown in FIGS. 5 to 7 are denoted by the same reference numerals and detailed description thereof is omitted.

Figure 12:
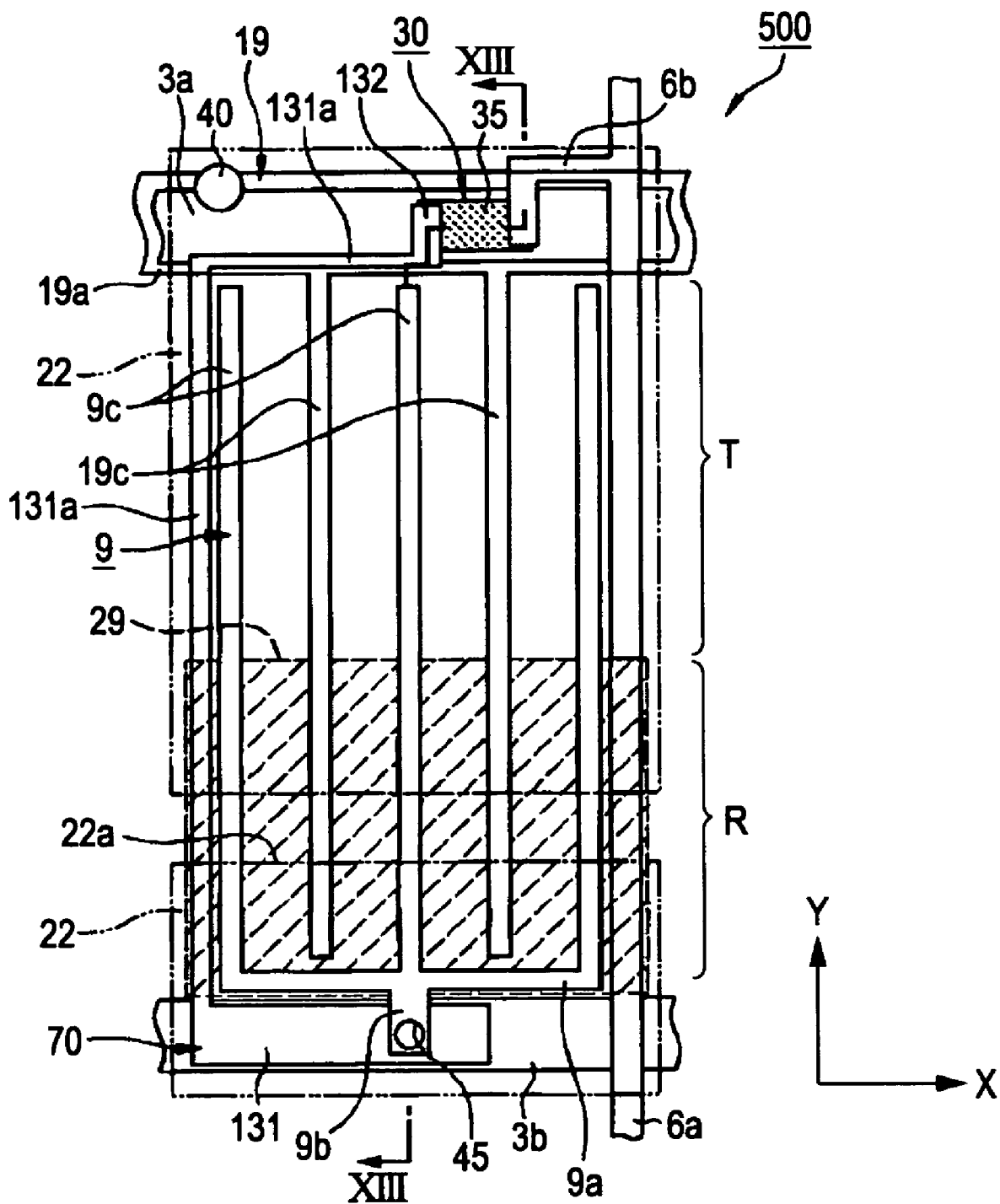
FIG. 12 is a plan view illustrating a liquid crystal display device according to a fifth embodiment.

As shown in FIG. 12, the color filters (color material layers) 22 are formed to correspond to the sub pixel areas of the liquid crystal display device 500, and a band-shaped opening 22a crossing the corresponding sub pixel area in the X axis direction is formed in each color filter 22. The opening 22a is formed at the center in the Y axis direction of the reflective display area R. The width in the Y axis direction of the opening 22a is about ⅕ of the width in the Y axis direction of the reflective display area R. Accordingly, the color filter 22 according to the fifth embodiment has a first color material area formed out of a color material layer having no opening corresponding to the transmissive display area T and a second color material area formed out of a color material layer having the opening corresponding to the reflective display area R. The chromaticity of the whole second color material area having the opening 22a is less than that of the first color material area corresponding to the transmissive display area T. Accordingly, it is possible to allow the visual quality of the reflective display using the light passing through the color filter 22 two times for the display to be equal to that of the transmissive display.

Figure 13:
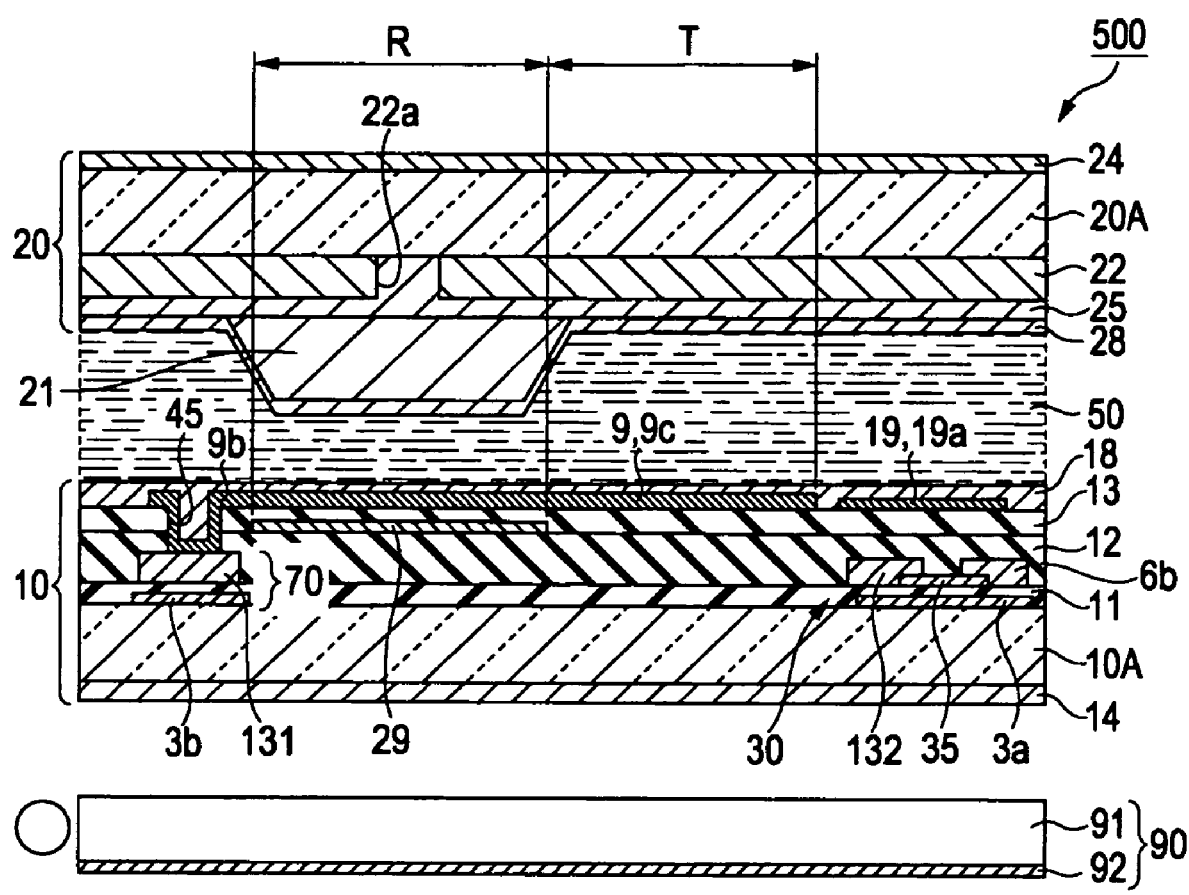
FIG. 13 is a partially sectional view taken along Line H-H' of FIG. 12.

As can be seen from the sectional structure shown in FIG. 13, the color filter 22 is formed on the inner surface of the substrate body 20A as a base body of the counter substrate (second substrate) 20 and the planarization layer 25 is formed to cover the color filter 22. In addition, the planarization layer 25 is filled in a recessed portion on the substrate body 20A resulting from the opening 22a of the color filter 22 to fill the recessed portion. As a result, the surface of the planarization layer 25 opposed to the liquid crystal layer 50 forms a flat plane and the retardation layer 21 is formed on the flat plane. The planarization layer 25 can be made of, for example, acryl or silicon oxide.

In the liquid crystal display device 500 according to the fifth embodiment having the above-mentioned structure, similarly to the liquid crystal display device 400 according to the fourth embodiment, since the unevenness resulting from the opening 22a is made flat by the planarization layer 25 and then the retardation layer 21 is formed thereon, it is possible to easily form the retardation layer 21 having a desired phase difference, thereby obtaining the high-contrast display.

As the color filter 22, different color material layers are formed in different sub pixel areas, and the thicknesses of the color material layers can be different from each other. Accordingly, when the retardation layer 21 is formed directly on the color filter 22, the height of the retardation layer 21 protruded into the liquid crystal layer 50 may be different between the sub pixels having different color filters 22. Therefore, by making the unevenness on the surface of the color filter 22 in the sub pixel area flat by the use of the planarization layer 25 according to the fifth embodiment and thus making the unevenness between the sub pixels flat, it is possible to unify the protruded height of the retardation layer 21 serving as a liquid-crystal-layer-thickness adjusting layer, thereby easily obtaining high-contrast display.

As a result of measuring the electro-optical characteristic of the liquid crystal display device 500 according to the fifth embodiment similarly to the liquid crystal display device 200 according to the second embodiment, it is possible to obtain the same result as the liquid crystal display device 200 shown in FIG. 7B, and thus to embody a display device in which reflective display quality and transmissive display quality are consistent with each other in any of white display, black display, and intermediate gray-scale display.

Although it has been described in the fifth embodiment that a band-shaped opening crossing the sub pixel area in the X axis direction is provided as the opening 22a of the color filter 22, the two-dimensional shape of the opening 22a is not limited to the band shape, but may employ a variety of shapes. For example, an opening having a rectangular shape, a polygonal shape, or a circular shape may be formed in the color material layer in the reflective display area R.

Although it has been described in the fifth embodiment that the opening 22a is selectively formed to adjust the chromaticity of the second color material area corresponding to the reflective display area R, the following structures may be used to adjust the chromaticity: a structure that the thickness of the color material layer in the second color material area is set smaller than the thickness of the color material layer in the first color material area; a structure that a color material layer having chromaticity different from that of the first color material area is formed in the second color material area; and a structure that color material areas having three or more colors are formed in the sub pixel area to obtain desired chromaticity by a mixed color thereof. Even when any of the structures described above is employed, unevenness resulting from the difference in thickness of the color material layers may be formed on the surface of the color filter 22 and thus it may be difficult to obtain the desired phase difference only by forming the retardation layer 21 directly on the color filter 22. Even when the surface of the color filter 22 is made flat in the reflective display area R, the height of the retardation layer 21 protruded into the liquid crystal layer 50 may not be uniform between the sub pixels having different color material layers formed therein, because the retardation layer 21 according to the invention also serves as a liquid-crystal-layer-thickness adjusting layer for making the thickness of the liquid crystal layer 50 different between the transmissive display area T and the reflective display area R by means of its own thickness. Therefore, as in the fifth embodiment, by forming the planarization layer 25 to cover the color filter 22 and then forming the retardation layer 21 on the corresponding planariza-tion layer 25, it is possible to make not only the thickness of the retardation layer 21 but also the height of the retardation layer 21 protruded into the liquid crystal layer 50 uniform between the sub pixels, thereby obtaining the high-contrast display from the whole display area.

Electronic Apparatus

Figure 9:
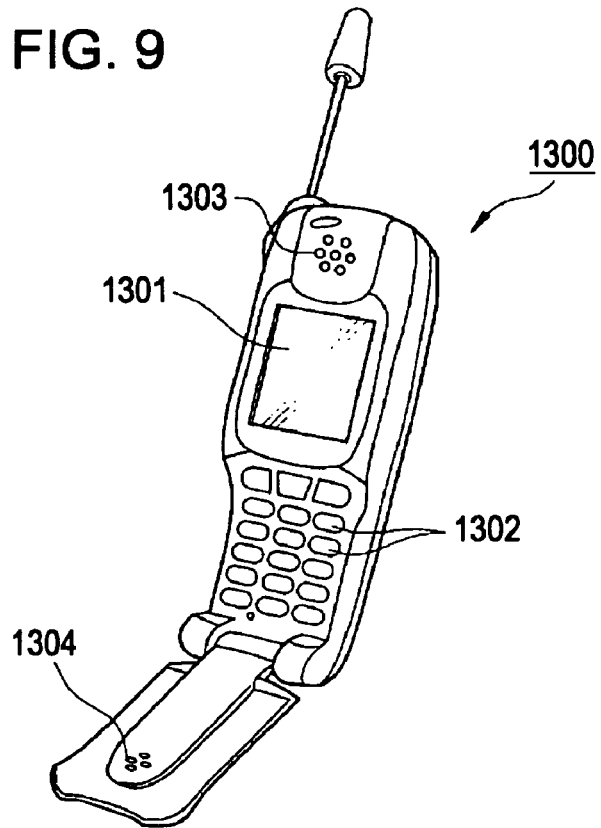
FIG. 9 is a perspective view illustrating an example of an electronic apparatus.

FIG. 9 is a perspective view illustrating a mobile phone as an example of an electronic apparatus having the liquid crystal display device according to the invention as a display unit. The mobile phone 1300 has the liquid crystal display device according to the invention as a small-sized display unit 1301 and includes a plurality of operation buttons 1302, an earpiece 1303, and a mouthpiece 1304.

The liquid crystal display device according to the abovementioned embodiments can be very suitably used as an image display unit for an electronic book, a personal computer, a digital still camera, a liquid crystal television, a view finder type or monitor direct-view type video tape recorder, a car navigation apparatus, a pager, an electronic pocketbook, an electronic calculator, a word processor, a work station, a television phone, a POS terminal, an apparatus having a touch panel, and the like in addition to the mobile phone. Accordingly, it is possible to obtain transmissive display and reflective display with high contrast and wide viewing angle.

What is claimed is:

1. A liquid crystal display device, comprising:
  a first substrate and a second substrate opposed to each other;
  a liquid crystal layer between the first substrate and the second substrate, liquid crystal molecules of the liquid crystal layer aligning with a first direction in an initial state;
  a first electrode and a second electrode between the liquid crystal layer and the first substrate, an electric field being generated between the first electrode and the second electrode and driving the liquid crystal layer;
  a sub pixel area including a reflective display area for reflective display and a transmissive display area for transmissive display, a thickness of the liquid crystal layer in the reflective display area being less than a thickness of the liquid crystal layer in the transmissive display area; and
  a retardation layer in between the liquid crystal layer and the second substrate selectively in an area corresponding to at least the reflective display area, the retardation layer having a phase-lag axis in a second direction intersecting the first direction, the first direction and the second direction defining an acute angle and an obtuse angle,
  wherein when the electric field is generated between the first electrode and the second electrode, the liquid crystal molecules move from alignment in the first direction in the initial state, through a region that corresponds to the obtuse angle, and into alignment with the electric field.

2. The liquid crystal display device according to claim 1, wherein the liquid crystal layer in the reflective display area causes a phase difference of about λ/4 to incident light at a time of non-driving.

3. The liquid crystal display device according to claim 2, the retardation layer causing a phase difference of about λ/2 to the incident light.

4. The liquid crystal display device according to claim 1, the thickness of the liquid crystal layer being adjusted by stacking the retardation layer and a resin layer.

5. The liquid crystal display device according to claim 3, the first electrode and the second electrode having a plurality of band-shaped electrodes.

6. The liquid crystal display device according to claim 3, the first electrode being a two-dimensional solid electrode and the second electrode having a plurality of band-shaped electrodes.

7. The liquid crystal display device according to claim 1, a color material layer having a plane area corresponding to the sub pixel area being formed on a side of the second substrate opposed to the liquid crystal layer, the color material layer having a first color material area corresponding to the transmissive display area and a second color material area corresponding to the reflective display area, and a recessed portion being formed in the second color material area by removing a part of the color material layer; and a planarization layer that makes at least the recessed portion of the color material layer flat being formed on the color material layer and the retardation layer being formed on the planarization layer.

8. An electronic apparatus, comprising:
the liquid crystal display device according to claim 1.

* * * * *

UNITED STATES PATENT AND TRADEMARK OFFICE
CERTIFICATE OF CORRECTION

| | | |
|---|---|---|
| PATENT NO. | : 7,602,463 B2 | Page 1 of 1 |
| APPLICATION NO. | : 11/485382 | |
| DATED | : October 13, 2009 | |
| INVENTOR(S) | : Hitoshi Tsuchiya et al. | |

It is certified that error appears in the above-identified patent and that said Letters Patent is hereby corrected as shown below:

Title Page;

Please delete the following:

"(73)   Assignee: Sanyo Epson Imaging Devices Corp., Tokyo (JP)"

And replace with:

(73)   Assignee: Epson Imaging Devices Corporation, Azumino (JP)

Signed and Sealed this
Twelfth Day of April, 2011

David J. Kappos
*Director of the United States Patent and Trademark Office*